US010720742B2

(12) United States Patent
Siacotos et al.

(10) Patent No.: US 10,720,742 B2
(45) Date of Patent: Jul. 21, 2020

(54) FIXTURE FOR ELECTRICAL COMPONENTS ON POWERED OR POWER-CAPABLE STRUCTURES

(71) Applicants: Thomas J. Siacotos, Newark, CA (US); Patrick C. McDaid, San Jose, CA (US)

(72) Inventors: Thomas J. Siacotos, Newark, CA (US); Patrick C. McDaid, San Jose, CA (US)

( * ) Notice: Subject to any disclaimer, the term of this patent is extended or adjusted under 35 U.S.C. 154(b) by 0 days.

(21) Appl. No.: 16/417,416

(22) Filed: May 20, 2019

(65) Prior Publication Data

US 2019/0372286 A1    Dec. 5, 2019

Related U.S. Application Data

(63) Continuation of application No. 16/013,145, filed on Jun. 20, 2018, now Pat. No. 10,312,650.

(60) Provisional application No. 62/540,999, filed on Aug. 3, 2017.

(51) Int. Cl.
| | | |
|---|---|---|
| *H01R 33/90* | (2006.01) | |
| *H01R 33/96* | (2006.01) | |
| *G12B 9/00* | (2006.01) | |
| *G01D 11/24* | (2006.01) | |
| *H01Q 1/00* | (2006.01) | |
| *H01R 33/965* | (2006.01) | |

(52) U.S. Cl.
CPC ............ *H01R 33/90* (2013.01); *G01D 11/24* (2013.01); *G12B 9/00* (2013.01); *H01Q 1/00* (2013.01); *H01R 33/96* (2013.01); *H01R 33/9655* (2013.01)

(58) Field of Classification Search
CPC .... H01R 33/90; H01R 33/96; H01R 33/9655; G12B 9/00; G01D 11/24; H01Q 1/00
See application file for complete search history.

(56) References Cited

U.S. PATENT DOCUMENTS

| | | | | |
|---|---|---|---|---|
| 6,749,249 | B1* | 6/2004 | Lang ...................... | B60J 7/1621 |
| | | | | 296/100.1 |
| 7,371,100 | B1* | 5/2008 | Polnyi .................. | H05K 7/1053 |
| | | | | 439/331 |
| 8,127,890 | B2* | 3/2012 | Meyers .................. | A47C 12/00 |
| | | | | 182/156 |
| 2003/0199187 | A1* | 10/2003 | Hsiu .................... | H01R 13/501 |
| | | | | 439/218 |
| 2007/0152479 | A1* | 7/2007 | Howman ............... | A47C 7/021 |
| | | | | 297/180.11 |

(Continued)

*Primary Examiner* — Truc T Nguyen
(74) *Attorney, Agent, or Firm* — GSS Law Group; Gregory S. Smith; Phillip M. Wagner

(57) ABSTRACT

A fixture for holding electrical components on an external support structure protects the components from weather, dust, condensation, and mechanical impact. An example fixture includes a shell having an open bottom side; a base configured for sliding engagement with the bottom side of the shell, a first electrical connector held in a selected rotational orientation in the base; and a support frame configured for sliding engagement with the shell. The support frame includes a first component holder; a second component holder rotatably connected to the first component holder; and a third component holder rotatably connected to the second component holder and removably connected to the first component holder. An optional connector on the shell allows the fixture to be installed between a host connector and any previously-installed legacy equipment.

9 Claims, 19 Drawing Sheets

(56) References Cited

U.S. PATENT DOCUMENTS

| | | | |
|---|---|---|---|
| 2011/0159726 A1* | 6/2011 | Wang | H01R 13/518 439/540.1 |
| 2013/0078827 A1* | 3/2013 | Yeh | H01R 12/88 439/76.1 |

* cited by examiner

FIXTURE FOR ELECTRICAL COMPONENTS ON POWERED OR POWER-CAPABLE STRUCTURES

FIELD OF THE INVENTION

Apparatus embodiments relate generally to enclosures for electrical and electronic devices, and more particularly to weather-resistant enclosures for protecting electrical and electronic devices from damage or operational degradation.

BACKGROUND

Applications using electrical or electronic components may benefit from being sited on powered or power-capable structures. Example applications include sound monitoring, electronic communication, signal amplification and relay, optical sensing, traffic monitoring, radio communication with vehicles, and monitoring of physical phenomena such as particulate levels, vibration, power fluctuation, humidity and temperature.

Fixtures may be provided for holding electrical and/or electronic components, protecting the components, providing mechanical support, and providing interfaces for electrical power and electrical signals. Fixtures may further provide for vibration dampening, condensation control, voltage isolation, and capability for being positioned in a selected cardinal direction or a selected direction with respect to the ground or a structure. As an example, a solar control may be most effective when oriented toward an optimal cardinal direction, possibly toward the south for an installation in the northern hemisphere.

A fixture for electrical and electronic components may be attached to any of a number of different structures. Some structures may include an energized electrical receptacle available for connection to the fixture. Other structures may not have an electrical receptacle but may be capable of having an electrical receptacle installed. An electrical receptacle capable of electrically and mechanically connecting to a fixture may be referred to as a host receptacle. Examples of structures to which a fixture may be attached include pump sheds, windmills, masts, railroad signal gantries, HVAC systems, solar arrays, parking structures, light poles, structures associated with an electric power distribution system, stadium lighting, feedlot enclosures, mobile irrigation equipment, guard shacks, cellular telephone towers, aircraft hangers, police stations and drilling rigs. Natural structures like trees may be used to support a host receptacle, for example for lighting or loudspeakers.

Structures may be located in various settings including industrial parks, roadways, airports, harbors, farms, test facilities, military installations, recreational facilities, sporting venues, power stations, bodies of water, underground facilities, private homes and public parks. A fixture located in one of these locations may be exposed to rainfall, high humidity, heat, cold, dust, dirt, chemical agents capable of degrading materials in the fixture, contaminants, bright sunlight, salt spray, and other conditions and substances that may affect the operation of electrical or electronic components included in or attachable to the fixture. As used herein, a contaminant refers to a substance that, if admitted to the chamber, may interfere with the function of the electrical components in the fixture. Examples of contaminants include, but are not limited to, solvents such as water, turpentine, or alcohol, soap solutions or other cleaning compounds; debris, dust, dirt, guano, insects or insect-related substances and plant material such as seeds and leaves.

A fixture capable of secure mechanical and electrical connections to many different kinds of structures, providing long-duration protection to a variety of environmental conditions, and having mechanical and electrical interfaces readily configurable to many different applications has not been previously available.

SUMMARY

An example apparatus embodiment includes a shell having an open bottom side; a base configured for attachment to the bottom side of the shell, the base configured to hold a first electrical connector in a selected rotational orientation; and a support frame configured for sliding engagement with the shell. The support frame includes a first component holder; a second component holder rotatably connected to the first component holder; and a third component holder rotatably connected to the second component holder and removably connected to the first component holder.

The example apparatus may include a second electrical connector attached to the shell in the selected rotational orientation. Each of a plurality of electrical contacts on the second electrical connector may be electrically connected to a corresponding electrical contact on the first electrical connector. The selected rotational orientation may correspond to a selected cardinal direction on a host receptacle conforming to ANSI C136.

The first component holder may include a first holder connector and a second holder connector attached to a first longitudinal side of the first component holder; and a third holder connector and a fourth holder connector attached to a second longitudinal side of the first component holder. The second component holder may include a fifth holder connector and a sixth holder connector attached to a first longitudinal side of the second component holder; and a seventh holder connector and an eighth holder connector attached to a second longitudinal side of the second component holder, the seventh holder connector positioned to engage with the first holder connector, and the eighth holder connector positioned to engage with the second holder connector. The third component holder may include a ninth holder connector and a tenth holder connector attached to a first longitudinal side of the third component holder; and an eleventh holder connector and a twelfth holder connector attached to a second longitudinal side of the third component holder, the eleventh holder connector positioned to engage with the fifth holder connector, and the twelfth holder connector positioned to engage with the sixth holder connector. The ninth holder connector and the tenth holder connector may be positioned to engage with corresponding holder connectors on the first component holder but not with holder connectors on the second component holder.

The example apparatus may include a first elongate guide attached to an inner surface of the shell; and a second elongate guide attached to the inner surface of the shell, the second elongate guide and the first elongate guide positioned for a sliding fit of the first holder connector and the second holder connector between the first and second elongate guides. The example apparatus may further include a third elongate guide attached to the inner surface of the shell; and a fourth attached to the inner surface of the shell, the third elongate guide and the fourth elongate guide positioned for a sliding fit of the fifth holder connector and the sixth holder connector between the third and fourth elongate guides. The example apparatus may further include a fifth elongate guide attached to the inner surface of the shell; and a sixth elongate guide attached to the inner surface of the shell, the fifth elongate guide and the sixth elongate guide positioned for a sliding fit of the ninth holder connector and the tenth holder connector between the fifth and sixth elongate guides.

The shell may be formed with a plurality of vent openings adjacent the first elongate guide. The base may be formed with a drain opening positioned to drain moisture entering the shell through the vent openings. Elongate guides for holding the component support frame may be positioned to direct any liquid that enters the shell through the vent openings toward the base. Air may be exchanged between the interior of the shell and the surrounding atmosphere through the vent openings and drain openings.

The base may be formed with a socket sized for a close sliding fit of the first electrical connector. The socket may be formed with a protrusion configured for engagement with a corresponding depression in the first electrical connector, thereby establishing and maintaining the selected rotational orientation of the first electrical connector. The base may be formed with an aperture configured for receiving a projection extending from an inner surface of the shell, further establishing the selected rotational orientation of the base and the first electrical connector.

The example apparatus may further include a first tab extending from a first transverse side of the first component holder; a second tab extending upward from a first transverse side of the second component holder; a first pocket formed on an inside upper surface of the shell; and a second pocket formed on the inside upper surface of the shell, wherein the first tab is positioned to engage with the first pocket and the second tab is positioned to engage with the second pocket. The second pocket may optionally be too small to receive the first tab, thereby establishing a fixed rotational orientation of the support frame relative to the shell. The first pocket may optionally be so large as to accept, but not frictionally retain, the second tab.

The base further may include a removable battery cover. A selected one of the first, second, and third component holders may be configured as a battery holder.

An antenna platform may optionally be attached to an outer surface of the shell. Either one or both of the base and shell may each be marked with a symbol indicating a selected cardinal direction of installation on a host structure.

At least one of the first, second, and third component holders may be formed with a first wire notch and optionally a second wire notch. The support frame may be interposed between the first electrical connector and an inside surface of the shell.

At least one of the base and the shell may be marked with a symbol indicating a selected cardinal direction of installation on a host structure.

BRIEF DESCRIPTION OF THE DRAWINGS

FIG. 11b shows a detail of an example of vent openings and surrounding structures of the example fixture of FIG. 11a.

FIG. 12c shows an exploded perspective view of the example fixture of FIG. 12a.

FIG. 12d shows a schematic of example electrical connections between a first electrical connector and the optional second electrical connector for the example fixture of FIG. 12a.

DESCRIPTION

Figure 1:
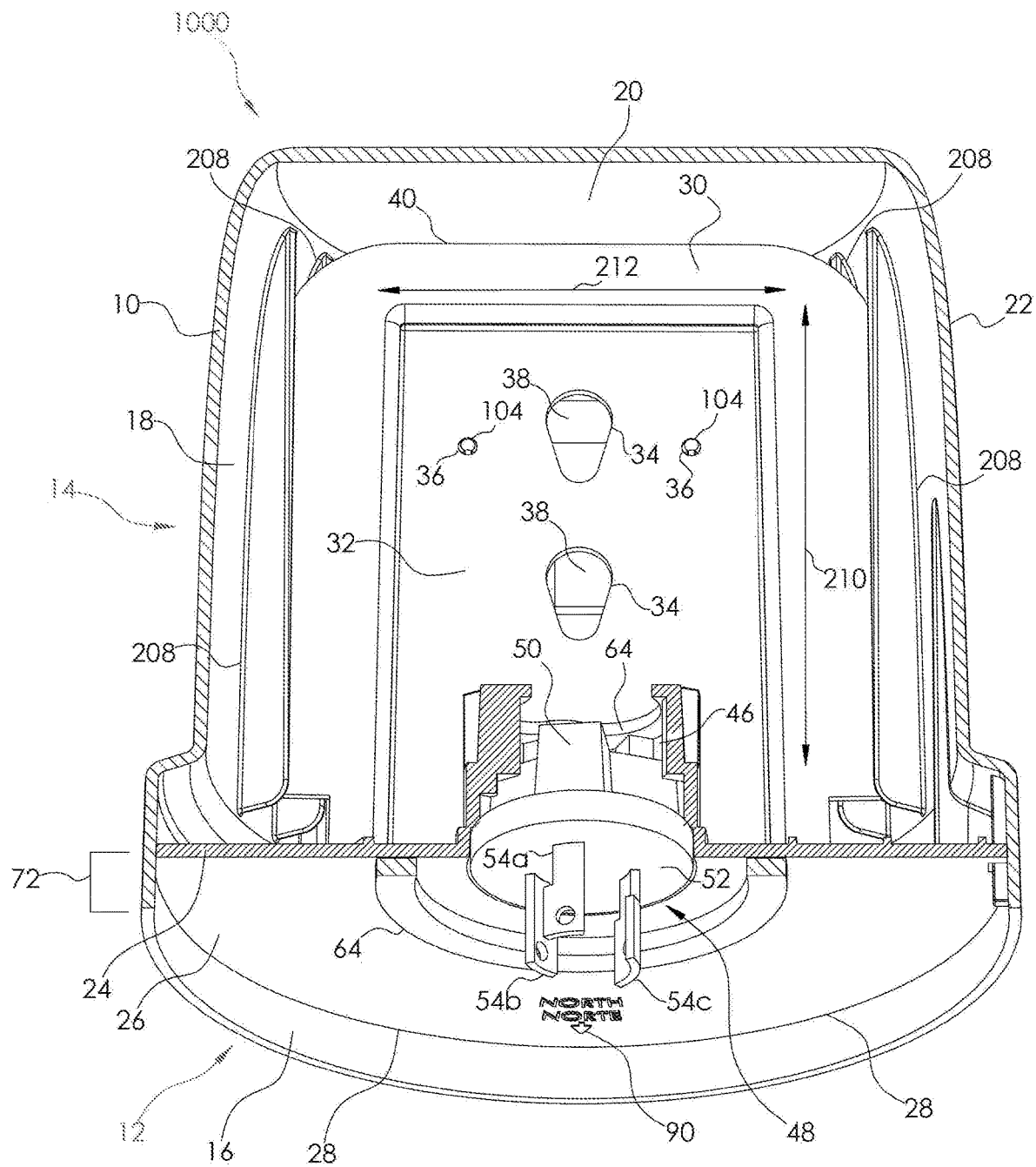
FIG. 1 shows a perspective section view of the side of an example fixture for enclosing electrical components.

An example fixture embodiment provides a multi-purpose platform adaptable for hosting electronics for a variety of applications. An example fixture includes a dome-like shell with an internal chamber having space and locating features for securely holding a support frame made from three holders rotatably joined by connectors. A disc-shaped base closes the shell's open end. The disclosed embodiments include voltage-isolated compartments and secure mounting surfaces for high voltage, low voltage, and battery-powered electronic components. The disclosed examples of a fixture are advantageous for enclosing, supporting and protecting a set of electrical components on a powered or power-capable structure, in interior and exterior applications.

An example fixture includes a shell defining a chamber, an open end, a base closing the open end, hardware to connect the fixture to a powered or power-capable structure, and one or more holders inside the chamber. Three holders may be interconnected to form a support frame with locating features that control the orientation of the support frame within the shell. During assembly, the holders may be populated individually. Optionally, the holders may be interconnected in a flat configuration and populated and tested, then folded to form the support frame. Optionally, the testing can occur after forming the support frame. The support frame, shell, and base facilitate efficient population of the holders with electrical components, assembly of a mechanically secure and stable framework of holders for test and field replacement test, physical support for a variety of optional components such as a radio antenna, and a shell receptacle that duplicates the orientation and power of a host receptacle on a host structure.

A fixture in accord with the disclosed embodiments may be installed on a host structure quickly and without the use of hand tools such as wrenches, pliers, screwdrivers, and the like, with minimum interruption in the operation of other devices previously installed on the host receptacle. For applications where it is required the fixture is installed in a selected orientation, perhaps with respect to a cardinal direction or relative to another structure, fixture embodiments include internal and external locating features for making sure the fixture is installed in the selected orientation. A fixture embodiment further provides internal support features for holding a variety of battery form factors. Some embodiments provide for tool-free activation of the electrical components without the need to access the chamber inside the shell. After installation is complete, electrical components in the shell may be activated without disassembly of the fixture. In some embodiments, the shell may include ventilation and drainage features effective for removing condensate that forms inside the shell, while opposing ingress of insects, contaminants and water into the shell, directing residual water ingress toward drains.

The fixture is configured for convenient, error-free assembly of the support frame into the shell, facilitating proper orientation of the electrical components to reference positions on the shell. During installation, features guarantee and confirm the fixture is properly oriented to the points of the compass. An optional shell receptacle, which may be identical to the host receptacle and electrically connected to the power entry connector in the base, preserves the availability, functionality and orientation of the host receptacle, spatially offset by the height of the fixture. These features provide for the rapid and tool-free interposition of this fixture between a host receptacle and any legacy equipment previously connected directly to the host receptacle, preserving the orientation of the legacy equipment to its originally-installed cardinal direction. After installation is complete, electrical components in the shell may be activated without disassembly of the fixture.

A fixture embodiment is advantageous for installation on a structure such as, but not limited to, a utility box, light pole or building that has a source of power such as an electrical outlet. In one example embodiment, a fixture is adapted for use on a streetlight luminaire with an energized host receptacle conforming to ANSI C136 and incorporating a corresponding commercially available power entry connector, like a plug, in the base. Optionally, the outside top of the fixture duplicates the host receptacle, preserving the host receptacle's orientation to a selected cardinal direction such as, for example, the direction north. A fixture embodiment may be quickly and conveniently interposed between previously installed equipment, such as a shorting cap, and the host receptacle, potentially increasing the number of structures capable to host a fixture.

The holders used to assemble the support frame have mechanical connectors positioned along the longitudinal sides of each holder to force the support frame to be assembled in a selected sequence of holders, with a selected side of each holder facing to the outside of the support frame. The sequence of holders may be laid flat so they may be conveniently populated with electrical components and any supporting members. If needed, they may be flipped, still flat, to populate the back sides. Then the holders are tilted up and pivoted until the ends of the sequence are connected, forming a stable support frame of three component holders, to facilitate further electrical connections, including interconnection among components on different holders, inspection and electrical burn-in and/or test. Tabs of different shapes on the upper edge or edges of the component holders, in conjunction with pockets on the inner surface of the shell, assure the support frame is properly rotated before installation in the shell. The pockets each frictionally hold one of the tabs (and therefore the support frame of component holders and any components attached to them) in place. Parallel ribs on the inner surface of the shell guide the connectors (at the outermost corners of the support frame), into the shell and prevent the support frame from rotating within the shell. The base further encloses the support frame within the shell. In some embodiments, fenders on the base minimize contact area between base and holders, mitigating the risk of condensation contact with the electrical components. In some embodiments, one or more wire notches at the longitudinal sides of one or more component holders may be used to hold wires interconnecting components.

Small holes in the base and a small pattern of angled holes (vent openings) toward the top and side of the shell facilitate convection, cooling the interior while further mitigating condensation. The angle of the vent openings discourages entry of falling rain or snow into the interior of the shell. In the event wind-driven rain or snow enters the vent openings, the water is blocked by one of the connectors, and directed downward by the ribs that guide that connector into the shell. In the example embodiment, each rib is formed as an elongate member extending from an interior surface of the shell. The holes in the base allow water to drain. Additionally, the holes in the base and the small pattern of angled holes in the shell may be configured to prevent ingress of contamination and insects.

In some embodiments, an offset surface at the perimeter of the disc-shaped base includes a field-removable battery cover large enough to accommodate four different shapes of batteries. One of the holders and a corresponding rib on the inner surface of the shell are configured to hold two of these shapes securely. Two smaller shaped batteries with an appropriately shaped space-filling adapter may also be held securely. A small panel on this holder accommodates a downwardly facing standard battery connector so that batteries may be easily and quickly replaced in the field.

In some embodiments, the shell incorporates an integrated platform for hosting ancillary equipment such as an antenna. Cable notches in the base and shell facilitate the routing of an antenna cable from inside the shell to the antenna in a favorable drip-loop configuration to avoid moisture ingress and to prevent the antenna cable from contacting the potentially abrasive, high temperature and energized host structure.

Alternative embodiments include a fixture having one, two, three, or more holders in the shell. A fixture may be assembled and tested simply, quickly and reliably, minimizing the risk of incorrect assembly, and reducing manufacturing, assembly, and maintenance costs.

A fixture may include integrated features for an external antenna, including an antenna mounting platform, a passageway for an antenna cable from the interior to the exterior of the enclosure, mounting features for reliably forming a drip loop in the cable, and support and protection for a cable-to-antenna connector.

The disclosed embodiments minimize exposure of installation, service, and maintenance personnel to components in the interior of the fixture during installation and during battery replacement. Battery changes may be made without the use of hand tools and without contacting electrical conductors and electrical components on the support frame in the shell.

A fixture may provide features to locate and secure electrical components, such as a magnet and a switch, for activating and de-activating the electrical components, without disassembling the fixture or exposing the components to the weather, and possibly without disconnecting the fixture from the powered structure, while at the same providing an optional capability of detecting unauthorized de-activation.

Other advantages of the example fixture embodiments include:

the shell, base and holders are readily configured for a wide variety of applications, without the need for building enclosures specialized for each application;

circuit components requiring AC voltage may be segregated spatially and/or electrically from components needing DC voltage; components susceptible to electrical interference may be segregated from noise-generating components, and components operating at high voltage may be isolated from components operating at lower voltages;

many different form factors of electrical storage batteries may be installed on a holder and accessed through a cover in the base;

venting positioned to inhibit the entrance of wind-driven precipitation and dust into the shell, and internal ridges direct material that succeeds in entering to drain holes in the base;

structural strength, integrity and durability, provided in part by ribs integrated in the shell, geometric interlocking of the three-sided component support frame in the shell, and aligned interconnection of the support frame with the shell;

a support frame that may be unfolded for installation and/or servicing of components, then folded into a rigid structure that does not require the use of separate fasteners, and installed in the shell in only one allowed orientation;

pass-through electrical connections for power, light sensing, and other electrical functions, provided in some embodiments by a power entry connector, for example a plug in the base, and a shell receptacle; and in some embodiments, activation of internal circuits by a magnetic switch operable by another magnet positioned near the shell.

Table 1 summarizes nomenclature and reference designators appearing in the figures and the written description to follow.

TABLE 1

Reference Numbers (Ref. No.) and nomenclature

| Ref. No. | Description | Ref. No. | Description | Ref. No. | Description |
|---|---|---|---|---|---|
| 10 | shell | 12 | open end | 14 | chamber |
| 16 | first inner surface | 18 | second inner surface | 20 | third inner surface |
| 22 | outer surface | 24 | base | 26 | base face |
| 28 | perimeter | 30 | holder | 32 | oblong shallow pocket |
| 34 | vents | 36 | attachment hole | 38 | electrical components |
| 40 | upper edge | 42 | longitudinal side | 44 | guide |
| 46 | socket | 48 | power entry connector | 50 | plug body |
| 52 | client face | 54 | blade | 54a | line blade |
| 54b | load blade | 54c | neutral-or-common blade | 56 | wiring terminal |
| 56a | line terminal | 56b | load terminal | 56c | neutral-or-common terminal |
| 64 | base gasket | 66 | host receptacle | 68 | powered structure |
| 70 | socket hole | 72 | skirt | 76 | load pin |
| 82 | neutral-or-common pin | 84 | stops | 86 | primary axis |
| 88 | first ray | 90 | base north mark | 92 | second ray |
| 94 | third ray | 96 | first aligning engagement | 98 | aperture |
| 100 | projection | 102 | circuit board | 104 | stand-off |
| 106 | second aligning engagement | 108 | depression | 110 | protrusion |

TABLE 1-continued

Reference Numbers (Ref. No.) and nomenclature

| Ref. No. | Description | Ref. No. | Description | Ref. No. | Description |
|---|---|---|---|---|---|
| 112 | shell north mark | 114 | fourth ray | 116 | first component holder |
| 118 | second component holder | 120 | third component holder | 122 | holder connection |
| 124 | pin | 126 | barrel | 128 | pin anchor |
| 130 | smaller pocket | 132 | larger pocket | 134 | smaller tab |
| 136 | larger tab | 140 | drain opening | 142 | fender |
| 144 | socket wall | 146 | vent openings | 148 | lower edge |
| 150 | shell portal | 152 | shell receptacle | 154 | shell receptacle north mark |
| 156 | shell gasket | 158 | shell receptacle mounting hole | 160 | boss |
| 162 | coaxial through-hole | 164 | switch | 166 | shoe |
| 168 | switch wires | 170 | groove | 172 | magnet |
| 174 | retainer | 176 | offset face | 178 | battery cover |
| 180 | walls | 180a | first wall | 180b | second wall |
| 180c | third wall | 182 | platform | 184 | gusset |
| 186 | minor surface | 188 | knockout | 188a | larger knockout |
| 188b | smaller knockout | 190 | fitting | 192 | antenna connector |
| 194 | first cable notch | 196 | second cable notch | 198 | cable |
| 200 | drip loop | 202 | battery | 204 | shell receptacle fastener |
| 206 | support frame | 208 | longitudinal rib | 210 | longitudinal direction |
| 212 | transverse direction | 214 | first longitudinal side | 216 | second longitudinal side |
| 218 | first transverse side | 220 | second transverse side | 222 | first holder connector |
| 224 | second holder connector | 226 | third holder connector | 228 | fourth holder connector |
| 230 | fifth holder connector | 232 | sixth holder connector | 234 | seventh holder connector |
| 236 | eighth holder connector | 238 | ninth holder connector | 240 | tenth holder connector |
| 242 | eleventh holder connector | 244 | twelfth holder connector | 248 | wire |
| 250 | first wire notch | 252 | second wire notch | 1000 | example fixture embodiment |

Turning now to the figures, FIG. 1 shows a perspective section view of the side of an example of a fixture embodiment 1000 for enclosing electrical components. A rigid molded polycarbonate weather-resistant concave shell 10 is an approximately circular open end 12 and defines a chamber 14 inside it. The shell has a first inner surface 16 extending from the open end about 25 mm into the chamber, all around, a second inner surface 18 extending from the first inner surface about 110 mm into the chamber, all around, and a third inner surface 20 closing the end of the chamber that is farthest from the open end, as well as an outer surface 22. An example rigid molded disc-shaped polycarbonate weather-resistant base 24 is attached to the shell by fasteners (not shown), further defining the chamber. The base has a base face 26 that faces away from the chamber and includes a base face north mark 90. The outermost extent of the base face forms a perimeter 28 similar in size and shape as the open end, substantially filling it, minimizing any gaps between the perimeter and the first inner surface. The base face is offset from the open end by about 10 mm, dividing the first inner surface. Therefore, a portion of the example shell forms a skirt 72.

FIG. 1 also shows an example of a thin, rigid and approximately oblong molded polycarbonate holder 30 within the chamber. A holder 30 may also be referred to as a component holder 30. The holder has an oblong shallow pocket 32 centrally placed, and two vents 34 in the bottom of the oblong shallow pocket 32 for ventilation. The example holder also has three attachment holes 36 (in FIG. 1, one is obscured), the thickness of the holder 30 and the diameter of each attachment hole 36 sized to accept, in this example, a commercially available stand-off 104 on the far side of the holder 30, further connected to at least one other electrical component 38. The attachment hole is one example, and in other example holders, the attachment hole may take other forms as may be suitable for other stand-off designs or for electrical components 38 including, for example: perforations, slots, cutouts, hooks, hook-and-loop fasteners, clips and adhesive. The number of attachment holes may also be more or less than 3.

As suggested in the example of FIG. 1, a longitudinal direction 210 as used herein refers to a direction parallel to a longest side of a holder 30. A transverse direction 212 is approximately perpendicular to the longitudinal direction 210.

In FIG. 1, the electrical components 38 are partially visible through the example vents 34. The holder spans most of the distance from the base to the third inner surface, and also spans most of the distance from one location on the second inner surface to another location on the second inner surface. Thus the holder divides the chamber into two regions each region bounded by the holder, the base, and a portion of the inner surface of the shell. In this example fixture, electrical components appear in one region of the chamber only, but in other applications, electrical components may be placed in both regions of the chamber. The holder provides both physical and electrical isolation of electrical components in one region of the chamber from the other region of the chamber. For example, a lower voltage component may be placed in a designated region, insulated from higher voltage electrical components in the other region. The holder has an upper edge 40 near the third inner surface, a lower edge 148, obscured by the base 24 in FIG. 1, 148 in FIG. 4 opposite the upper edge 40, and two longitudinal sides (obscured by guides 44 in FIG. 1, 42 in FIG. 4). The example shell has three guides 44, each guide 44 formed by two longitudinal ribs 208 attached to the second inner surface 18, extending from near the first inner surface 16 to a point near the third inner surface 20. The longitudinal ribs 208 of each set of elongate guides 44 are spaced sufficiently apart from one another to receive holder connectors (e.g., 222, 224) positioned on the longitudinal sides of the holders, thereby preventing a support frame 206 assembled from the holders from rotating within the shell. The longitudinal ribs may be separated from one another sufficiently to admit holder connectors with a sliding fit. The third inner surface and the base prevent the holder from sliding longitudinally within the guides. Thus, the holder is slideably attached to the shell, and mechanically supports the electrical components within the chamber. Each guide may alternatively be another shape. For example, a guide may be a slot in the second inner surface.

An example socket 46 in the base face partially encloses an example power entry connector 48, such as a commercially available ANSI-compliant 3-pole 3-wire non-NEMA 10 amp 125 volt Power Entry Connector, Model HBL7567C available from Hubbell Wiring Device-Kellems, a division of Hubbell Incorporated of Shelton, Conn., with the black ribbed nylon housing and white nylon clamp and two screws removed, and is mounted in the socket in the base. The socket conforms to the outer extent of this power entry connector.

The power entry connector 48 includes a plug body 50 with a flat circular client face (52 in FIG. 4), a collection of rigid blades 54 and, for each of the blades, a wiring terminal 56. The power entry connector includes a line blade 54a, a load blade 54b, and a neutral-or-common blade 54c. The power entry connector 48 is rigidly attached in the socket 46. The blades 54 protrude perpendicularly from the client face, away from the chamber. The wiring terminals (not shown) extend into the chamber and are therefore on the opposite side of the plug body 50 from the blades 54. A round weather-resistant base gasket 64 may be attached with adhesive centrally to the base face.

Figure 2:
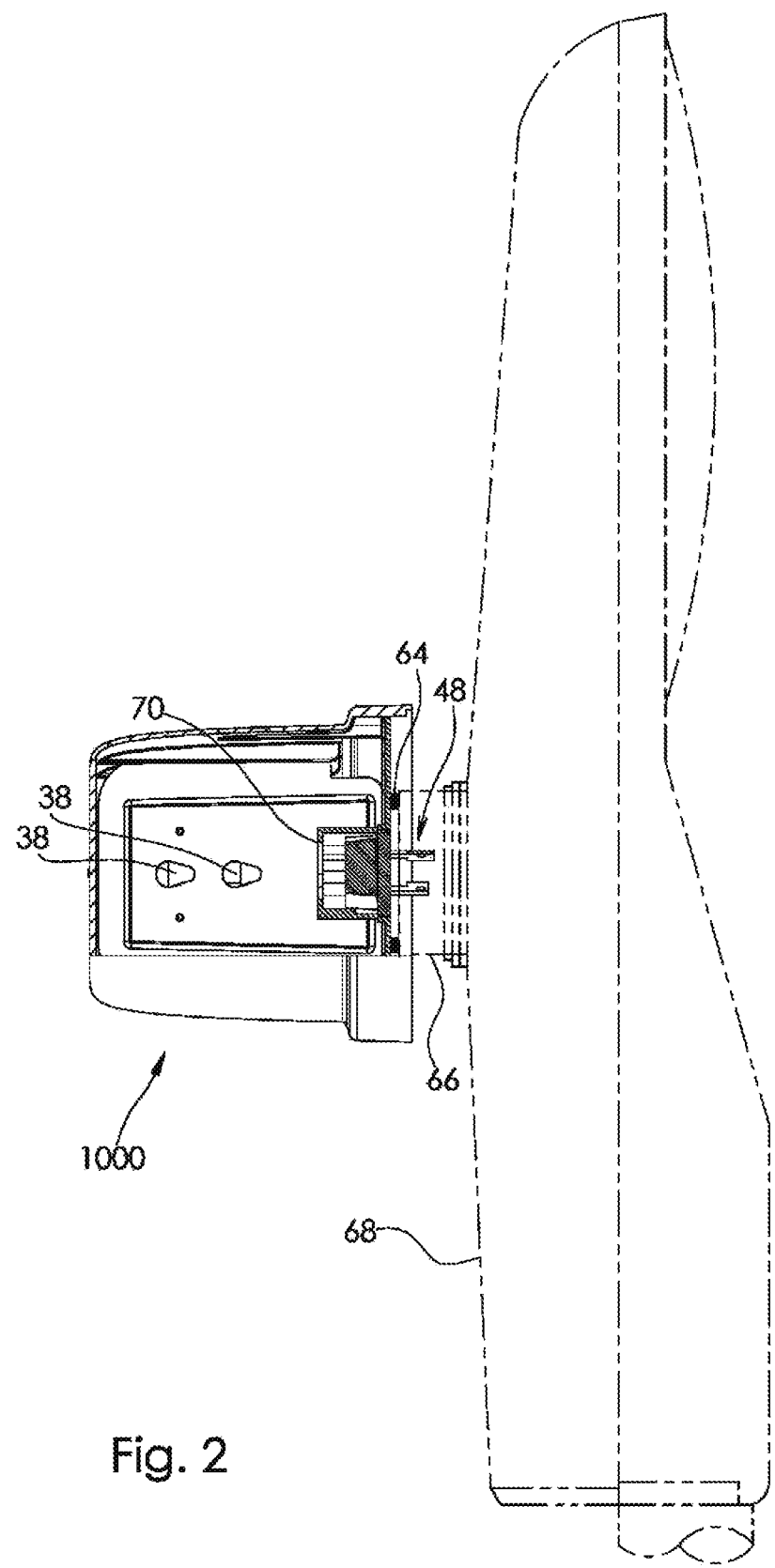
FIG. 2 shows an orthogonal partial section view of the example fixture of FIG. 1 installed on an example of a host structure represented by a street light luminaire.

FIG. 2 shows an orthogonal partial section view of the side of the example fixture embodiment 1000 of FIG. 1. The fixture is mounted on an example ANSI-compliant host receptacle 66 rigidly attached to an example powered structure 68, in the example of FIG. 2 a luminaire on a street light. As used herein a structure refers to an arrangement and organization of interrelated elements in a material object or system capable of supporting a physical load. A powered structure refers to a structure that is configured to receive electric power, for example through an electrical connector, or alternatively a structure including a source of electrical power, where the source is energized. A power-capable structure may not be a powered structure, but may be converted to a powered structure. Unless otherwise noted, herein "ANSI" and "the applicable ANSI specification" refer to ANSI C136 and subsequent revisions. A receptacle refers to a flange- or box-mounted wiring device with conducting elements recessed behind a mating surface, for connection to a source of electrical power or electrical signals, designed to accept an electrical plug or inlet that may be connected to a load. A host receptacle refers to a receptacle mounted to a structure and capable of mechanically and electrically connecting to an embodiment of a fixture disclosed herein.

Continuing with the example of FIG. 2, the power entry connector 48 may be rigidly and releasably attached to the host receptacle 66, providing secure and stable mechanical and electrical connections. A base gasket 64 fills the space between the base face and the face of the host receptacle 66. A socket hole 70 inside the socket farthest from the base face accommodates wires (not shown) proceeding from the power entry connector 48 toward the electrical components 38 farther into the chamber.

Figure 3:
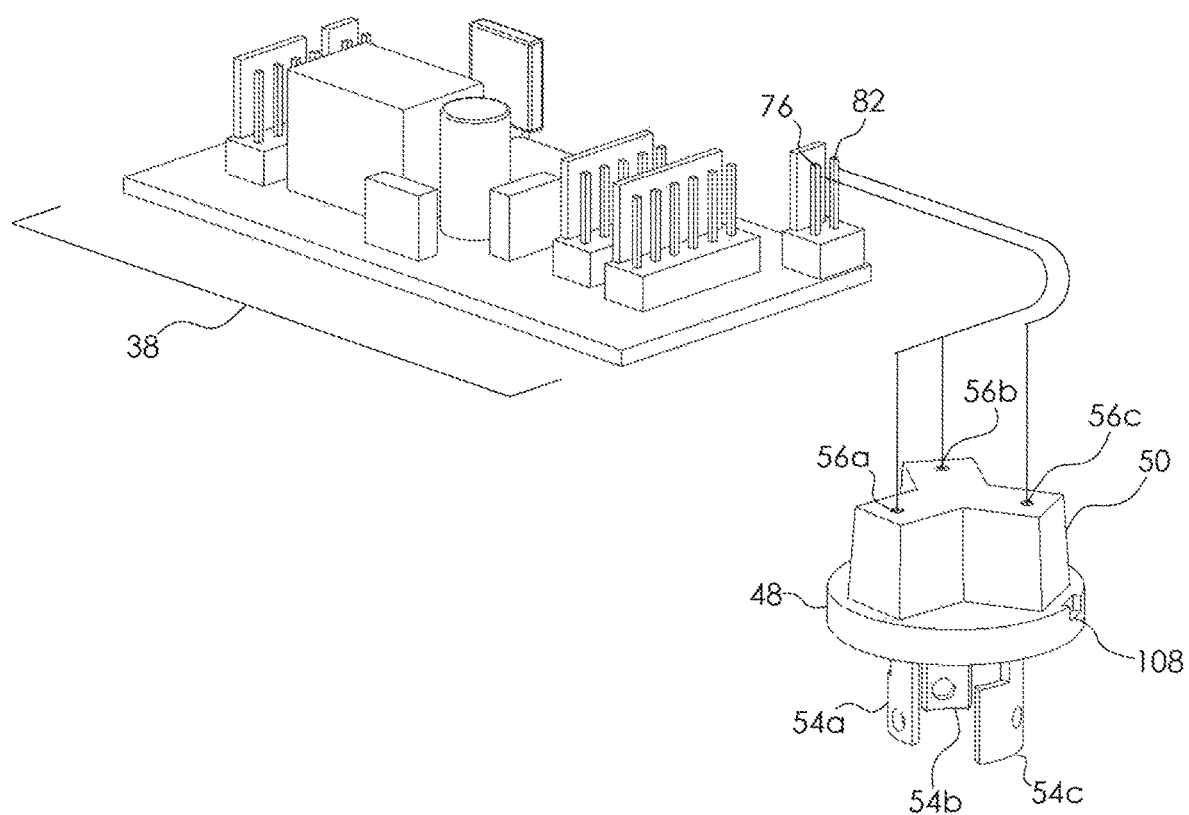
FIG. 3 shows a schematic of an example set of electrical components and electrical connections within the example fixture of FIG. 1.

FIG. 3 shows a schematic view of an example of electrical connections within the example fixture of FIG. 1. The blades 54a, 54b and 54c continue from the client face through the plug body toward the chamber. The line blade 54a connects to a line terminal 56a connected by wires 248 to a load pin 76 on the electrical components 38. The load blade 54b connects to a load terminal 56b also connected by wires to the load pin 76. Thus the line blade 54a and load pin 76 are connected to maintain equal electrical potential. The neutral-or-common blade 54c is connected to a neutral-or-common terminal 56c connected by wires to a neutral-or-common pin 82 on the electrical components 38. Thus the neutral-or-common blade 54c and the neutral-or-common pin 82 are connected to maintain equal electrical potential.

Figure 4:
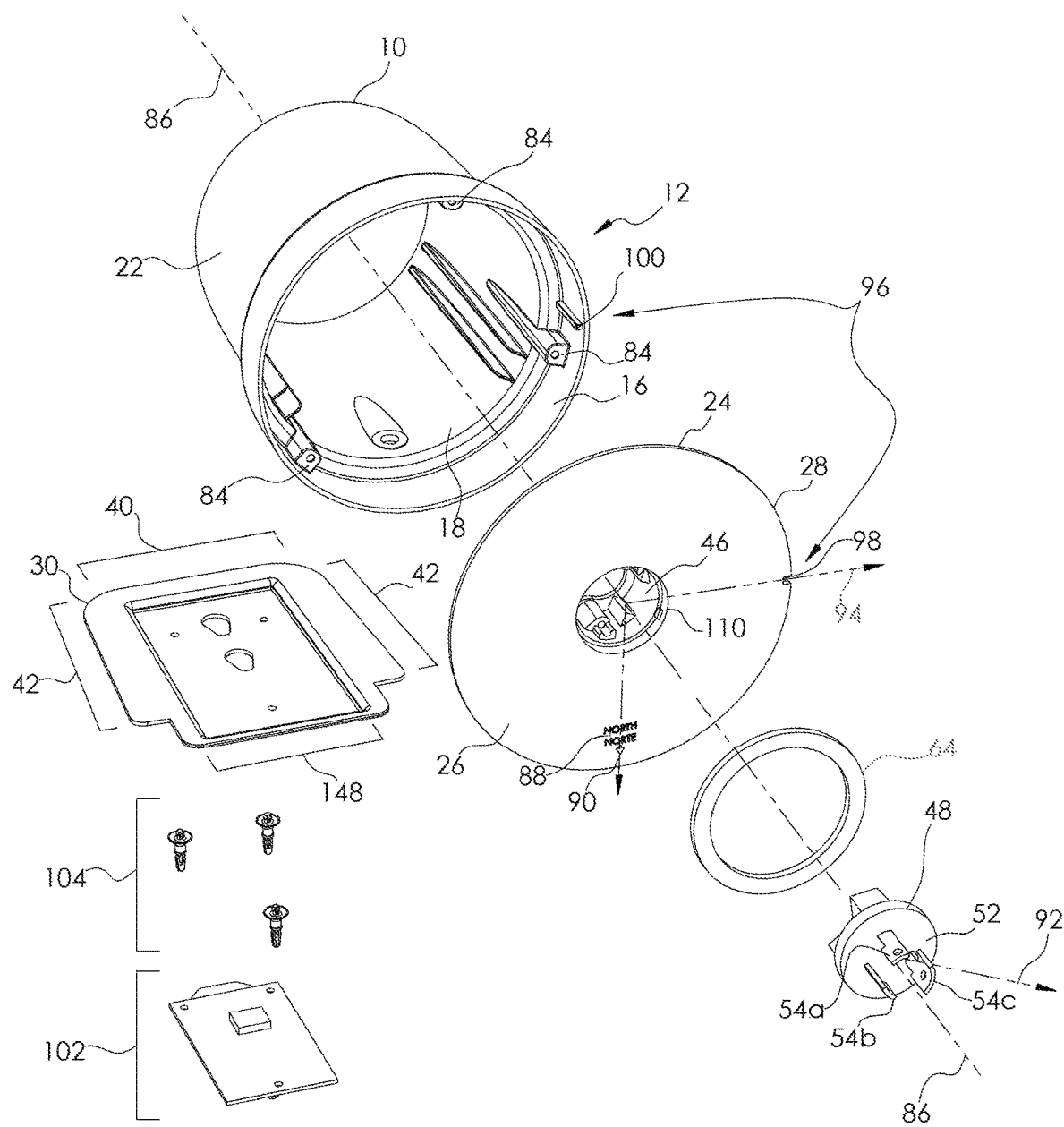
FIG. 4 shows a perspective exploded view of the example fixture of FIG. 1.

FIG. 4 shows a perspective exploded view of the example fixture of FIG. 1, viewed from the open end of the shell 10. Three stops 84 approximately 10 mm×10 mm located approximately 13 mm from the open end, project from the first inner surface 16 and the second inner surface 18. The stops are approximately evenly spaced around the first inner surface and, in the fixture, the base 24 is immediately adjacent these stops. The distance of the stops from the open end, minus the thickness of the base, determines the offset of the base face from the open end, forming the skirt (72 in FIG. 1).

Figure 7:
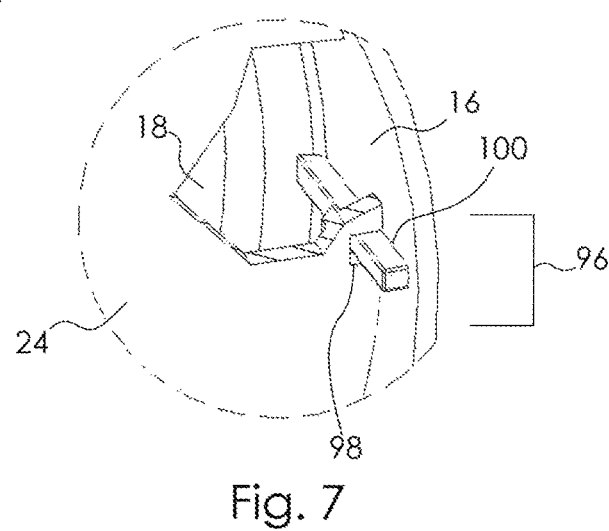
FIG. 7 shows a perspective detail view of an example first aligning engagement of the example fixture of FIG. 1.

FIG. 4 also shows a primary axis 86 piercing the center of the client face 52 and normal to it. A first ray 88 extends from the primary axis, perpendicular to it, and piercing the base north mark 90 on the base face 26. A second ray 92 extends from the primary axis, perpendicular to it, and piercing the center of the cross-section of the neutral-or-common blade 54c where it emerges from the client face. A third ray 94 extends from the primary axis, perpendicular to it, and piercing an element of a first aligning engagement 96 which in this example fixture includes an aperture 98 in the perimeter 28 of the base. The aperture 98 is positioned to receive another element of the first aligning engagement 96, a projection 100 on the first inner surface extending from near the open end 12 to near the second inner surface. (FIG. 7 shows a perspective detail view of this example first aligning engagement, with a portion of the base removed to show that the projection 100 extends along the first inner surface from the open end toward the second inner surface.)

FIG. 4 also shows example electrical components, a populated circuit board 102, and three stand-offs 104.

Figure 5:
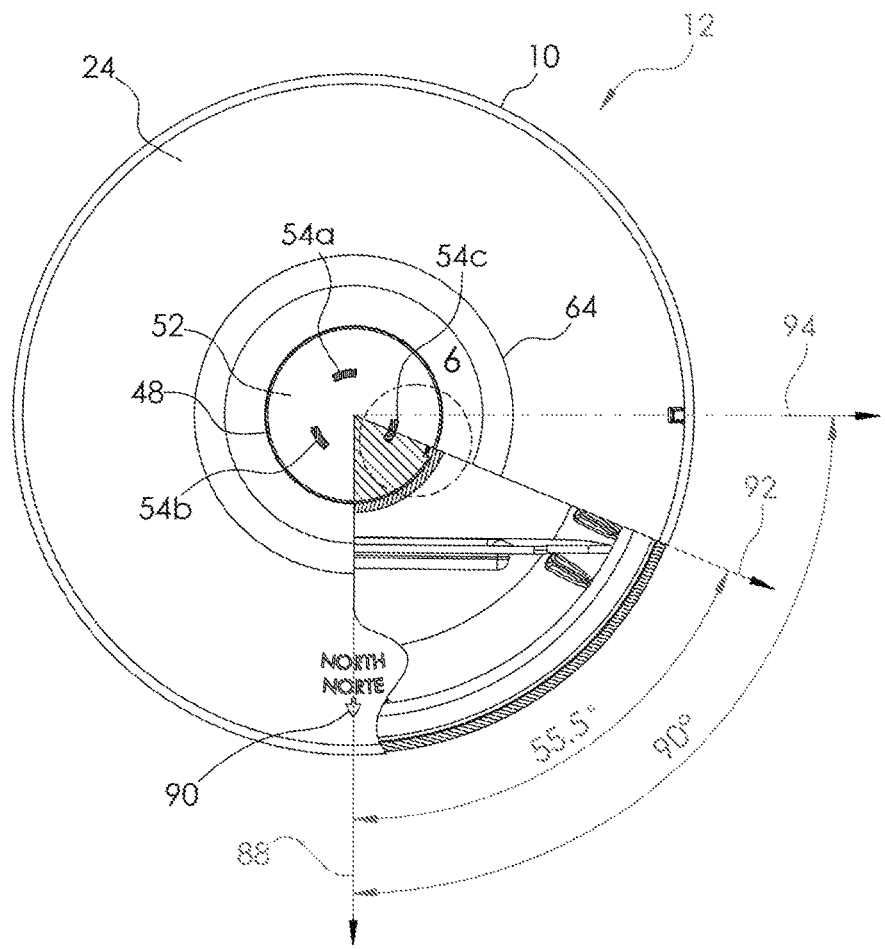
FIG. 5 shows an orthogonal bottom partial section view of the example fixture of FIG. 1.
Figure 6:
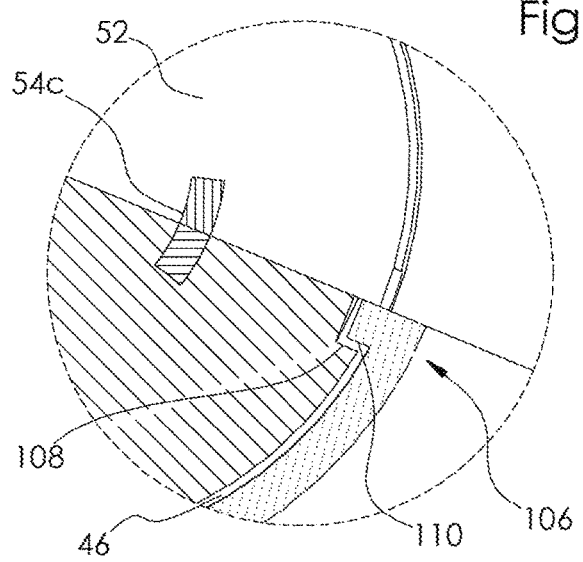
FIG. 6 shows a detail view of an example second aligning engagement shown in FIG. 5.

FIG. 5 shows an orthogonal bottom partial section view of the example fixture of FIG. 1, viewed from the open end. A wedge-shaped section, bounded by on two sides by the projection of the first ray and the projection of the second ray onto the base face, has been removed for clarity. The projections of the first ray and the second ray form an acute angle of 55.5°. Additionally, the blades have been sectioned near the client face 52 to more clearly see their cross-section. FIG. 5 and the detail view in FIG. 6 demonstrate that a second aligning engagement 106 including a depression 108 disposed on the side of the power entry connector 48, where the depression is aligned with the center of the cross-section, close to the client face 52, of the neutral-or-common blade, and further including a protrusion 110 disposed on the side wall of the socket 46 and closely conforming to the depression 108. FIG. 5 also demonstrates that the base north mark 90 is rotated about the primary axis counter-clockwise 55.5° from the protrusion 110 and, therefore, the center of the cross-section of the neutral-or-common blade. This example arrangement, complying with the requirements of FIG. 1 of ANSI C136.10, assures that when the fixture is rigidly releasably attached to an ANSI-compliant host receptacle 66, with the north mark on the host receptacle pointing north, the base north mark 90 will also point north, and therefore the base north mark reliably indicates to a human observer the direction north. The orientation of the north mark on an ANSI-compliant host receptacle 66 is defined in FIG. 2 of ANSI C136.10.

Figure 8:
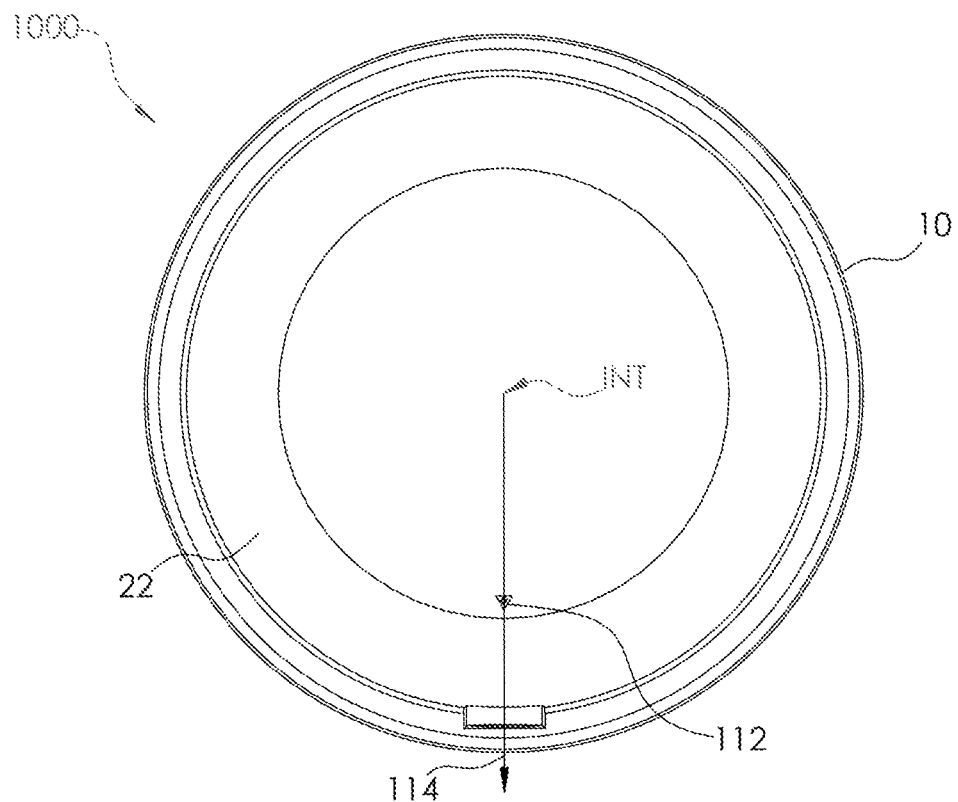
FIG. 8 is an orthogonal view toward a top side of the example fixture of FIG. 5.

FIG. 8 is an orthogonal view of the example fixture of FIG. 5, rotated horizontally 180°. An example of a shell north mark 112 is on the outer surface 22, about 4 cm from the primary axis (not shown) where it intersects the outer surface at "INT". A fourth ray 114 emanating from the primary axis, perpendicular to it and piercing the shell north mark is parallel to, and proceeds in the same direction as, the first ray of FIGS. 4 and 5. Thus, the shell north mark remains aligned with the base north mark and the first aligning engagement 96 assures it remains so. Thus, when the fixture is rigidly releasably attached to an ANSI-compliant host receptacle 66 with the north mark on the host receptacle pointing north, the shell north mark 112 will point in the same direction as the north mark on the host receptacle 66, and will reliably indicate to a human observer the direction north.

Alternative Examples

In the above example, the shell may resemble a frustum of a cone with its smaller end closed, but other shapes are possible, such as circular cylinders, non-circular cylinders, other frusta or domes. The example shell is approximately 14 cm by 14 cm, but the shell may be larger or smaller provided the chamber is sufficient to enclose the electrical components and any supporting members such as stand-offs needed for the application, and provided the fixture is light enough to be reliably supported by the host receptacle and powered structure.

In some embodiments, the chamber for holding the support frame is formed in the interior of the shell. Alternatively, the chamber may be formed by extending side walls upward from the base.

In the above example, transitions between the various inner surfaces are distinct, but more gradual transitions are possible, or the first inner surface may be continuous with the second inner surface.

In the above example, the third inner surface is flat, but it may be concave provided the distance between the upper edge and the concavity is acceptable in the application. The third inner surface may also be convex, provided the resulting concavity of the opposite section of the outer surface is not so concave that excessive dirt, rain or contamination will accumulate.

In the above example, the open end is approximately disc shaped, but other shapes are possible, such as octagonal, oval or oblong. In the above example, the base is also disc shaped, but alternatively may be a different shape provided the base substantially fills the open end, adequately supports the power entry connector, and prevents the holder from sliding out of the chamber.

In the above example, the distance from the open end to the base face is about 10 mm, but may be less than 10 mm when a shorter skirt 72 is formed on the shell 10. Alternatively, the base may be flush with the open end, provided this arrangement does not create a gap between the perimeter and the shell allowing ingress of contaminates and provided the skirt is not essential to the application. The offset may be more than 10 mm, provided the skirt is not so long that it interferes with the powered structure, preventing connection to the host receptacle.

In the above example, the base is solid, but may have perforations provided they are small enough so the base substantially prevents ingress of wind-driven contaminates.

In the above example, the base is attached to the shell by fasteners, but alternative attachments may be used such as a retaining groove molded into the first inner surface, snaps molded into the shell, clips, press-fit pins or welds provided these attachments are compatible with the materials of construction.

In the above example, the power entry connector is the Hubbell Model HBL7567C, as modified. However, other configurations are possible. For example, another off-the-shelf plug may be used provided that it complies with ANSI, provided it is compatible with the wires leading from it, and provided the internal geometry of the socket conforms closely to the plug. Alternatively, the power entry connector need not be commercially available; the plug may be built in-house, or it may be integral to the base. For example, the blades and wiring terminals may be insert-molded. More blades such as 4 or 5 may be appropriate for different applications such as connecting to different host receptacle configurations. Such applications may operate at different voltages.

In the above example, the base includes a socket. However, other configurations are possible. For example, the base and socket may be two separate components joined to each other prior to installing an off-the-shelf plug. This may be desirable if, for example, a more flexible material is required for the base and a more rigid material is required for the socket, provided a base-to-socket seal is maintained. In still other embodiments, the base and socket may be connected by a base-to-socket adapter, provided a base-to-socket seal is maintained. In the above example, the power entry connector is attached to the base, but other configurations are possible, such as an in-house plug separate from the base but connected to it, or a base with insert-molded components that function as a plug.

In the above example, the power entry connector is attached to the base by screws, but various attachments may be used such as press-fit pins, snaps molded to the socket, or welds, depending on the specific power entry connector.

In the above example, the base, shell and holder are made of polycarbonate, but other polymers such nylon or polypropylene may be used, or a laminate of metal enclosed by polymer may be used, provided the resulting components are sufficiently rigid, impact resistant, electrically insulating and otherwise meet requirements related to the application such as the requirement for fire resistance in ANSI.

In the above example, the holder is approximately oblong but other shapes are possible such as a dog-bone, a square, or an isosceles trapezoid, provided the holder substantially spans the distance between the base and the third inner surface, and there are a minimum of two side-edges that may slide within the guides. In the above example, an oblong shallow pocket provides stiffness, but other ways of providing stiffness may be used, such as ribs. The longitudinal sides need not engage the guides directly but extensions proceeding outwardly from the longitudinal sides, or rigid components rigidly attached to the longitudinal sides, may engage the guides. The longitudinal ribs of the guides need not span the entire distance from the first inner surface to the third inner surface, provided they engage enough of the corresponding longitudinal side to prevent the holder from rotating within the chamber. The guides need not be made of two ribs but may be made by other geometry such as one rib rising at an acute angle from the second inner surface, the longitudinal sides located near the apex of this acute angle. Alternatively, the guides may be a channel within the second inner surface of the shell, provided the guides conform to the longitudinal sides of the holder, or to the extensions from the longitudinal sides, if any, and the channel does not create a wall in the shell that weakens it. The holder may be narrower or wider provided the resulting subdivisions of the chamber are sufficient to accommodate any components therein.

In the above example, the holder is a structure on which electric components are mounted. However, the holder may be an electric structure provided the other requirements of the holder, such as having longitudinal sides to engage the guides, are met. For example, the holder may be a flat rigid PC board with longitudinal sides to engage the guides.

In the above example, the projection 100 is a tooth, but may be made of other features including, for example, a key, bump or rib. There may be more than one projection 100, each projection 100 optionally shaped differently than the others. When there are more than two projections 100, unequal separation distances between projections 100 may be selected to establish a preferred orientation of the base.

In the above example, the aperture 98 is in the perimeter 28 of the base 24, but may be on the first inner surface 16 provided the projection is on the perimeter and provided the aperture receives the projection with a close sliding fit.

In the above example, the base may be attached to the shell by a fastener (not shown) through the base. Examples of fasteners include screws, press-fit pins, snaps molded to the first inner surface of the shell, or welds.

In the above example, the shell north mark is a small debossed arrow, but may be larger, or may be embossed, or both, and may be another symbol, provided the shell north mark is visually distinct from the outer surface and is visually clear and unambiguously communicates the direction north. The shell north mark may be placed a different distance from the primary axis, so long as it is visually far enough from the center of the outer surface as to be unambiguously associated with a particular side of the fixture, thus indicating a direction.

Assembly and Usage of Example Fixture

To assemble the example fixture, a human assembler first attaches the base gasket onto the base face near the socket. The assembler attaches the various electrical components and any supporting members such as stand-offs to the holder. The assembler threads insulated wires through the socket, and then using the insulated wires connects the wiring terminals on the power entry connector to the load pin and the neutral-or-common pin of the electrical components in accordance with FIG. 3. The assembler slides the holder, with the electrical components attached, into the chamber. This is done by first orienting the upper edge toward the chamber, and then simultaneously placing each of the longitudinal sides into its respective guides, then sliding the holder along the guides until the upper edge of the holder is near the third inner surface. With the base face facing away from the open end, the assembler advances the base toward the open end. The assembler rotates the base such that the aperture is aligned to fit over the projection, and then moves the base further into the chamber until the base abuts the stops. Using screws (not shown), the assembler attaches the base to the shell. With the client face and the blades facing away from the socket, the assembler advances the power entry connector toward the socket. This action pushes the wires through the socket hole located inside the socket, into the chamber. The assembler rotates the power entry connector such that the depression is aligned to fit over the protrusion, then the power entry connector is moved into the socket until the client face is flush with the base face. Using screws (not shown), the assembler attaches the power entry connector to the base.

To use the fixture, a human installer brings the fixture to the powered structure, such as the street light and street light luminaire shown in FIG. 2. If the ANSI-compliant host receptacle 66 has a device plugged into it, such as a shorting cap, the installer must first remove it.

Next, aligning the base north mark approximately with the north mark on the host receptacle, the blades of the power entry connector are inserted into the host receptacle. At this point, any power signal at the terminals of the host receptacle will appear at the load pin 76 and the neutral-or-common pin 82 of the electrical components 38.

Next, the installer twists the fixture slightly, clockwise, to lock. The base gasket now fills the gap between the base face and the host receptacle. Next, to further confirm the installation is correct, the installer would visually verify the shell north mark points north, that is, in the same direction observed prior to installation as the north mark on the host receptacle.

Another Example Fixture

Figure 9A:
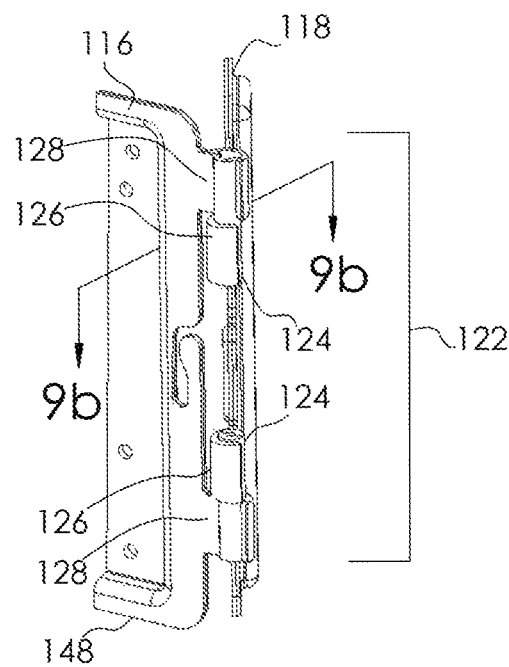
FIGS. 9a, 9b, 9c, and 9d show examples of some details of holders.
Figure 9B:
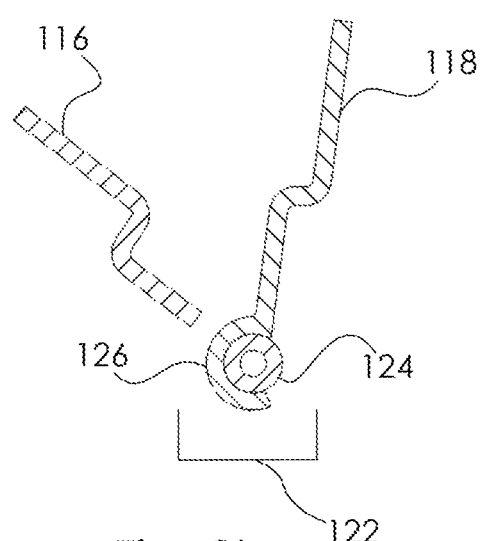

In another example fixture, the number of holders is three, a first component holder 116, a second component holder 118, and a third component holder 120. FIG. 9a shows a perspective partial view of an example holder connector 122 that includes two rigid pins 124, each connected to one of the two longitudinal sides of the first component holder 116 via a pin anchor 128, and also includes two rigid barrels 126, each connected to one of the two longitudinal sides of the second component holder 118. FIG. 9b shows a sectional view of the holder connection 122 of FIG. 9a.

The barrels have an inner surface conforming to a cylinder of length and diameter also conforming to the cylindrical pin. Each barrel is open along one side of the barrel and composed of sufficiently flexible material so as to, under force of assembly, admit a one rigid pin. The pin is of sufficient diameter and length to closely conform to the inner surface of the corresponding barrel. Thus the barrel retains the pin unless and until significant force of disassembly is applied.

Each pin is attached to the side-edge of the corresponding holder by a rigid pin anchor 128. The distance between pin-anchors conforms closely to the distance between the corresponding two barrels so that, once assembled, motion of the pins along the axis of the pin is not possible. Also, the length of engagement of each pin with its corresponding barrel is sufficient to prevent rotation of the pin within the barrel, except about the axis of the pin. Thus, the holder connection 122 pivotally reversibly attaches the longitudinal sides of two different holders.

Figure 9C:
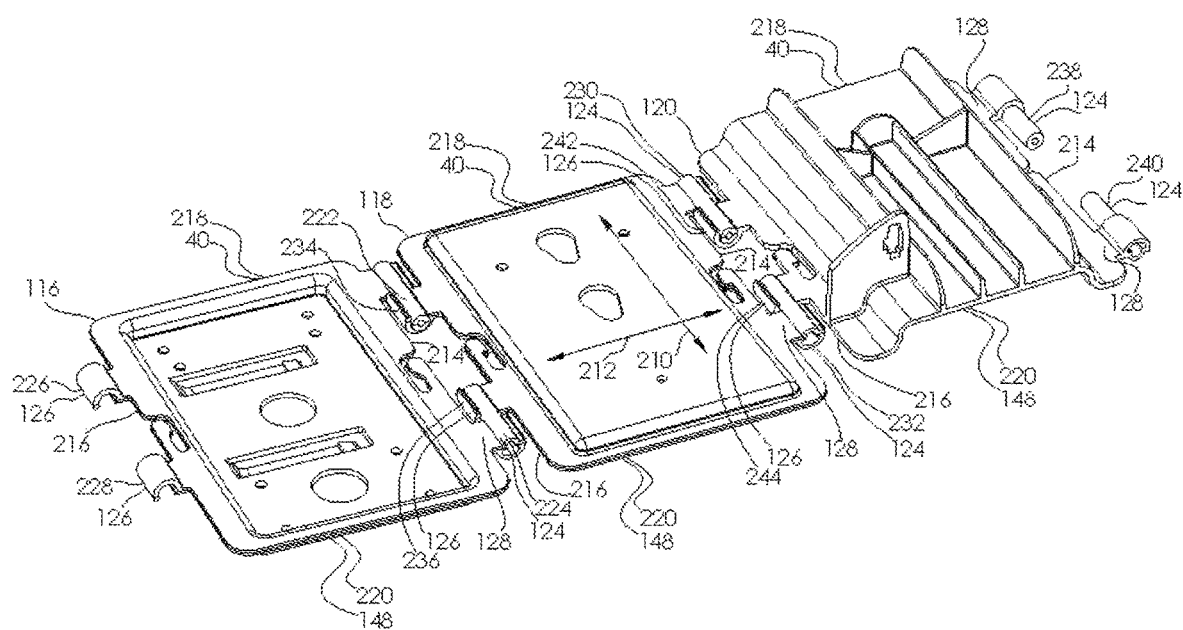
Figure 9D:
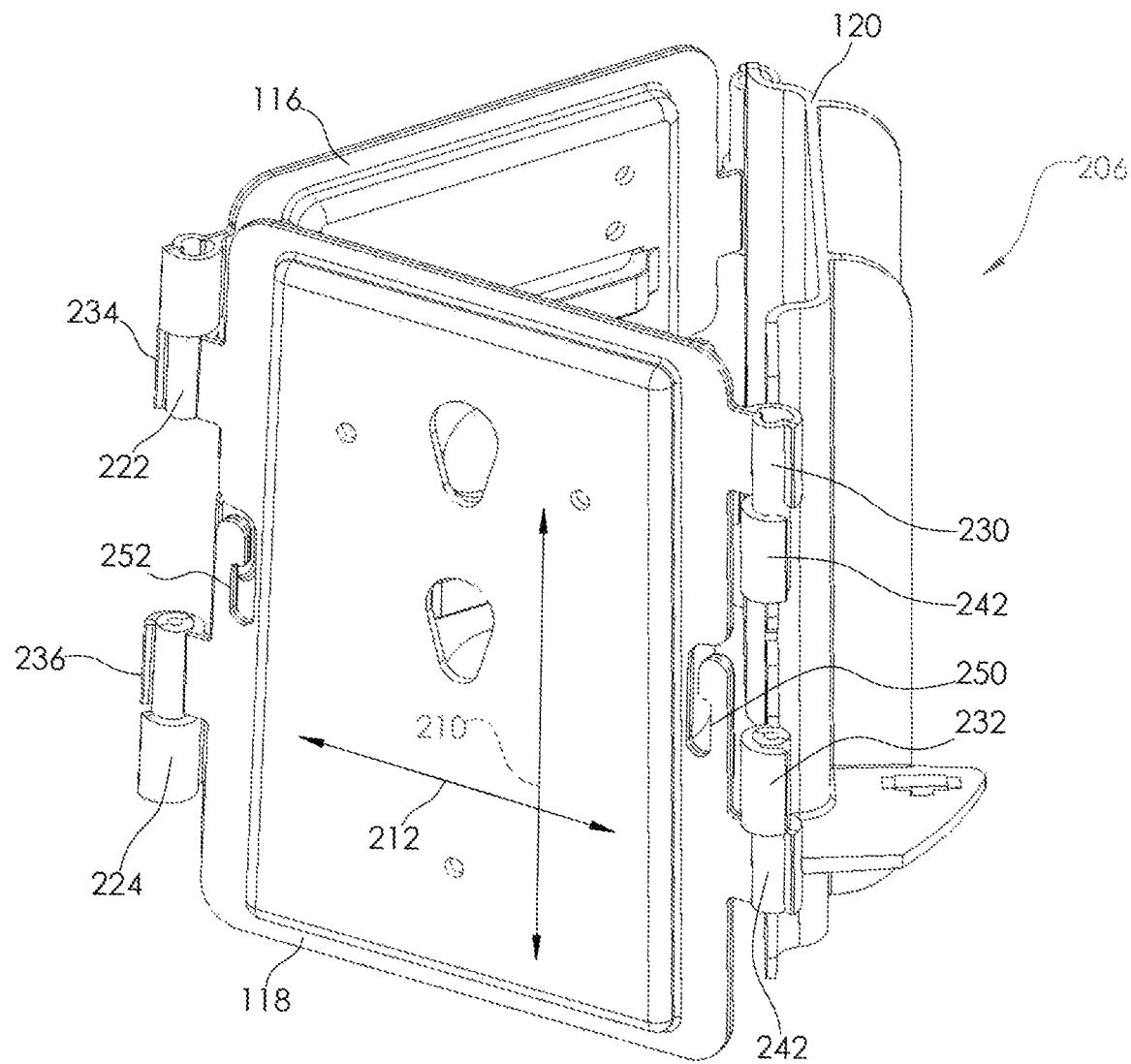

FIG. 9c shows a perspective view of three different holders, interconnected in a flat configuration, utilizing the holder connection 122 of FIG. 9a. FIG. 9d shows a perspective view of an example of a support frame 206 formed from the interconnected first 116, second 118, and third 120 component holders of FIG. 9c. Each of the first component holder 116, second component holder 118, and third component holder 120 include a first longitudinal side 214, a second longitudinal side 216 opposite the first longitudinal side, a first transverse side 218 joining the first and second longitudinal sides, and a second transverse side 220 joining the first and second longitudinal sides, opposite the first transverse side.

Rotatable mechanical connections between the holders are made by holder connectors attached along the longitudinal sides of each holder. A holder connector may be either a pin 124 or a barrel 126. A barrel 126 may be sized for a snap fit over the corresponding pin 124. For example, the first component holder 116 includes a first holder connector 222 and a second holder connector 224 extending outward from the first longitudinal side 214. A third holder connector 226 and a fourth holder connector 228 extend outward from the second longitudinal side 216 of the first component holder 116. The second component holder 118 includes a fifth holder connector 230 and a sixth holder connector 232 extending outward from the first longitudinal side 214 of the second holder. A seventh holder connector 234 and an eighth holder connector 236 extend outward from the second longitudinal side 216 of the second component holder 118. The third component holder 120 includes a ninth holder connector 238 and a tenth holder connector 240 extending outward from the first longitudinal side 214 of the third holder. An eleventh holder connector 242 and a twelfth holder connector 244 extend outward from the second longitudinal side 216 of the third holder.

The holder connectors may be spaced so that the first longitudinal side 214 of the first component holder 116 connects to the second longitudinal side 216 of the second component holder 118 but not to either longitudinal side of the third component holder 120. The holder connectors may be spaced so that the first longitudinal side 214 of the second component holder 118 connects to the second longitudinal side 216 of the third component holder 120 but not to the longitudinal sides of the first component holder 116. The holder connectors may be spaced so that the first longitudinal side 214 of the third component holder 120 connects to the second longitudinal side 216 of the first component holder 116 but not to any other longitudinal side of the first and second holders.

In the example fixture of FIG. 9c, the distance between pin-anchors 128 is varied among the holders. The distance between the pin-anchors of the first component holder 116 is too far apart to admit both barrels of the third component holder 120 without substantial sliding. Meanwhile, the pin-anchors of the second component holder 118 are too close together to admit both the barrels of the first component holder 116. Thus the holder connections 122 allow assembly in no more than three sequences.

The first sequence (left to right in FIG. 9c) is first holder, second holder and third holder. As shown in the flat configuration of FIG. 9c, the barrels of the first holder are arranged so the concavity faces away from the viewer, while the barrels of the second holder and the third holder are arranged so the concavity faces toward the viewer. This implies that when arranging this first sequence into the support frame configuration of FIG. 9d, the concavity of the barrels of the first holder face the pins of the third holder, and thus the concavities of these barrels are available to admit and snap onto the pins.

The second sequence (left to right) is second holder third holder, first holder, (that sequence not shown) and the third sequence (left to right) is third holder, first holder, second holder. However, when arranging either sequence into a support frame configuration, the concavity of the unoccupied barrels face away from the pins, and thus these concavities are not available to admit and snap onto the pins. Therefore, assembly of the support frame configuration cannot be achieved in this way.

Thus, in this example fixture, the holder connections 122 enforce the sequence shown (left to right in FIG. 9c) and only this sequence can be rotated to form the support frame configuration shown in FIG. 9d. Thus, variation during assembly, and costly rework, are minimized. Additionally the support frame configuration is assembled without fasteners, so the cost is minimized. Thus also, a structure of holders in the support frame configuration is capable of physically supporting additional electrical components for purposes of further assembly and test. Additionally, FIG. 9d shows a first wire notch 250 and a second wire notch 252 that may be used to hold wires (not shown) that interconnect among components (not shown) on the component holders.

Figure 9E:
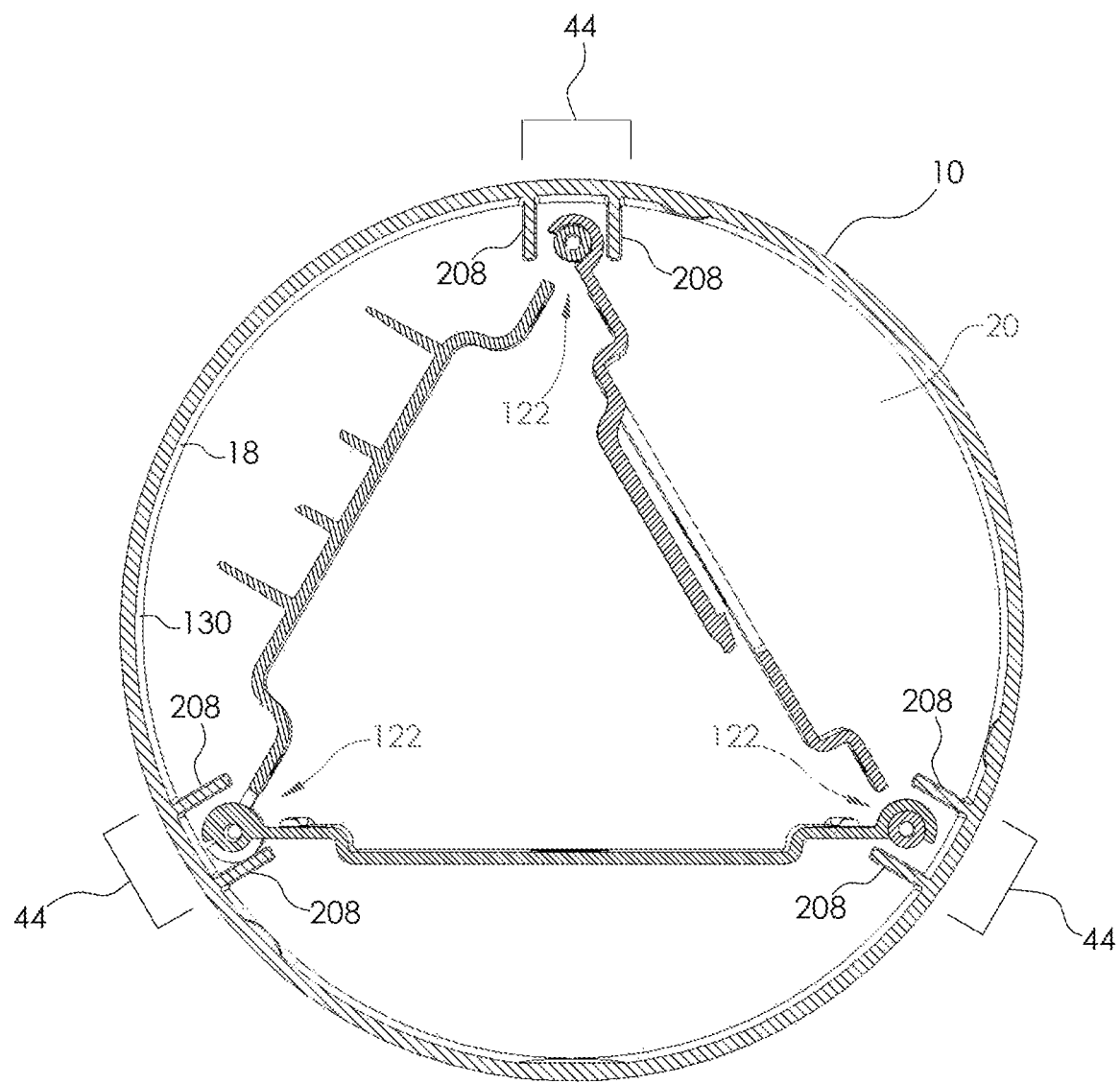
FIG. 9e shows a partial cross-sectional view of an example of a three-sided component support frame inside a shell.
Figure 10A:
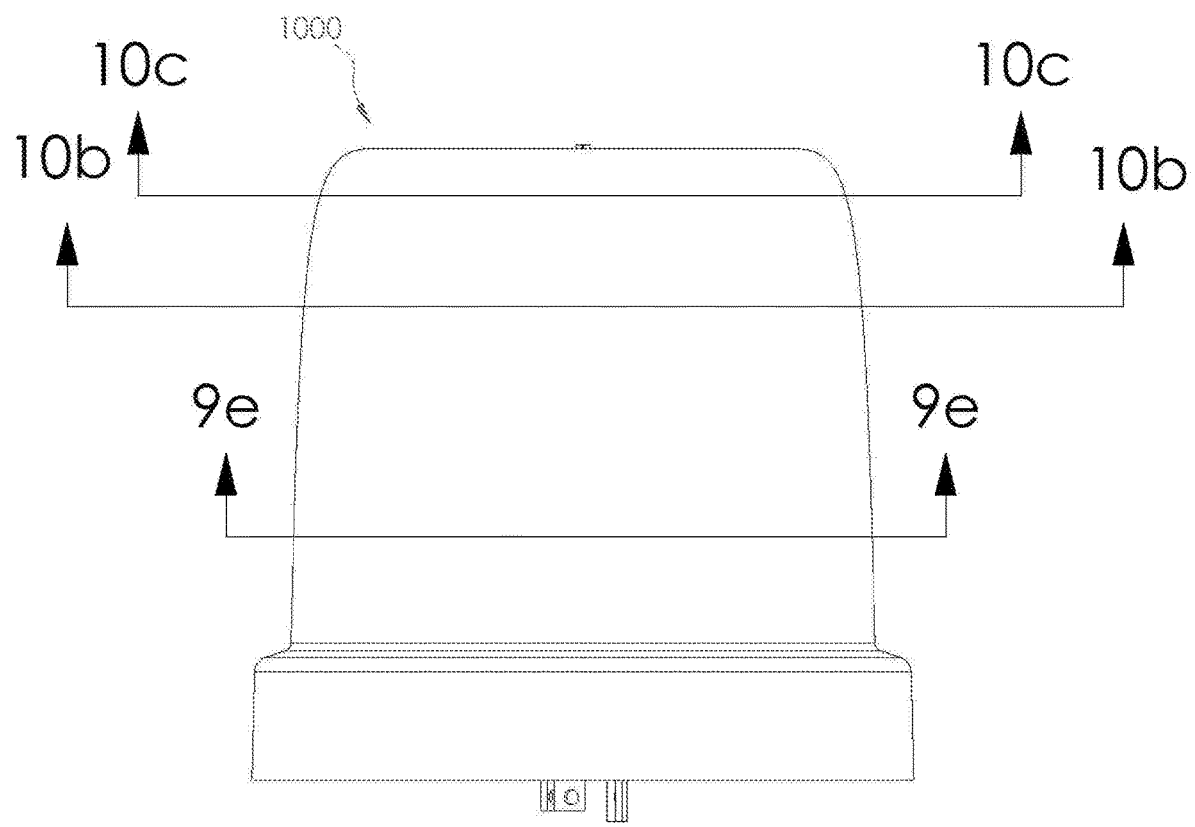
FIG. 10a shows an orthogonal side view of an example fixture.

FIG. 9e shows an orthogonal section view, as derived from the example of an example fixture embodiment 1000 in FIG. 10a, looking toward the third inner surface (not shown) of the shell, 30 mm deep. Three guides 44, each including two parallel longitudinal ribs, are disposed on the second inner surface 18 to slideably accept the holder connections 122 along the longitudinal sides of the support frame 206. When installed, the outermost extents of the holder connections 122 are near the second inner surface. The support frame is sufficiently rigid to prevent the holder connectors from escaping from between the elongate guides toward the center of the chamber in the shell. The longitudinal ribs of the guides are sufficiently tall to prevent rotation of the holders in the support frame configuration from rotating within the chamber. Thus the support frame may be conveniently introduced into the shell, with each holder connection 122 sliding along the corresponding guide 44 for convenient assembly but unable to escape from between the guides while inside the shell. Thus the support frame physically and electrically isolates regions of the chamber from one another, physically supports the electrical components, and maintains a predetermined orientation of the electrical components at a predetermined distance from other electrical components and from the shell 10 and the base.

Alternatives of this Example Fixture

The example holder connector may include a pin and a barrel, but other configurations are possible such as fewer or more pairs of pin and barrel, or a single pin anchor supporting two pins, or a single pin anchor supporting a long pin spanning two or more barrels, or living hinges, provided the guides are sufficient to accept and to retain the holder connection. The number of holders may be increased, provided the volume bounded by the holder and the adjacent second inner surface exceeds that volume required for the electrical components therein and between the holder connections and the guides there is sufficient mechanical interference to prevent the support frame rotating within the shell. The holder is fabricated of molded polycarbonate but may be other rigid polymers or may be made of electrical components such as a printed-circuit board assembly.

Operation of this Example Fixture

To assemble the support frame, a human assembler lays the third holder flat on a work surface, then pushes the pins of the second holder into the barrels of the third holder until they snap into place, and then pushes the pins of the first holder into the barrels of the second holder until they snap into place. One side of this sequence of holders may be populated with the electrical components and supporting members such as stand-offs. Some of those electrical components may be interconnected. If needed, the sequence of holders may be turned over, and more electrical components may be populated and interconnected. The assembler lifts the flat configuration and, bending the first holder and the third holder backward, snaps the pins of the third holder into the barrels of the first holder, forming a support frame. The support frame is optionally moved to a testing station to verify the electrical components. The support frame is oriented so each holder connection engages a corresponding guide disposed on the second inner surface of the shell, and the support frame is slid into the shell until the upper edge of one of the holders is near the third inner surface. Further assembly proceeds as previously described.

Description of Another Example Fixture

Figures 10B, 10C:
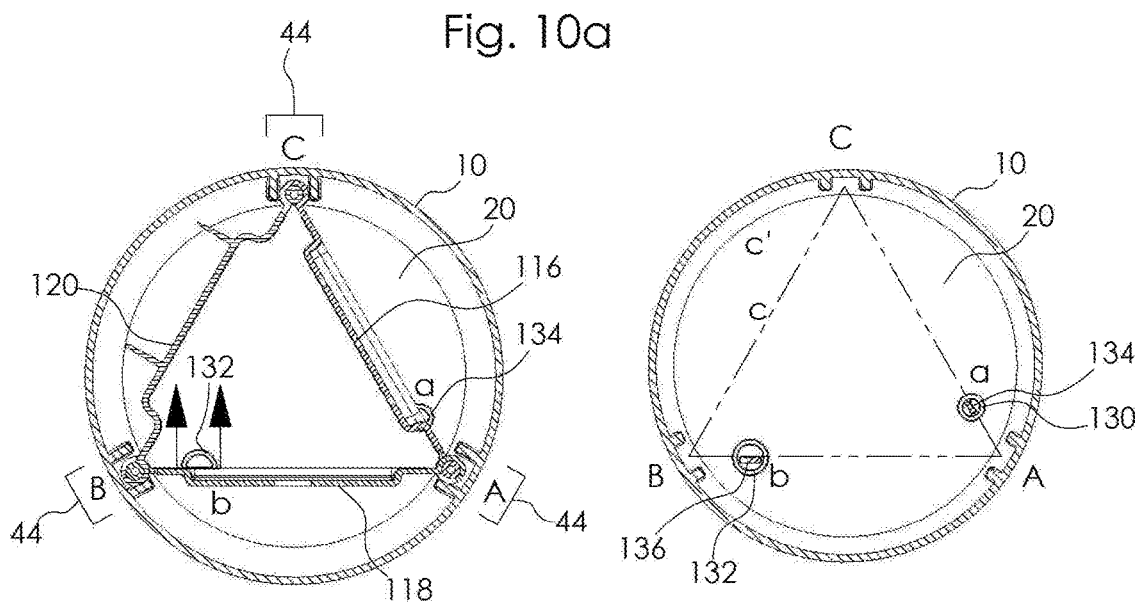
FIG. 10b shows a first section view, facing the third inner surface 20 of an example shell 10, depicting the rotational orientation of an example component support frame including the first holder 116, the second holder 118, and the third holder 120.
FIG. 10c shows a second section view, facing the third inner surface 20.

FIG. 10a shows an orthogonal side view of another example fixture embodiment 1000. FIG. 10b shows a first section view of the same fixture, facing the third inner surface 20 of an example shell 10, depicting the rotational orientation of the support frame of the example holders 116, 118 and 120. Guides 44 at A, B, and C, assure the edge holder connection 122 (in this example, including barrels and pins, unlabeled for clarity) of the holders 116, 118 and 120 form an equilateral triangle ΔABC. The centers of pockets, including a larger pocket 132 and a smaller pocket 130 extending from the third inner surface 20. Segments A-a and B-b are equal length.

FIG. 10c shows a second section view, facing the third inner surface 20. The larger tab 136 extends from the upper edge (40 in FIG. 9c) of the second component holder 118 and fits into the larger pocket 132 with a close sliding fit at b. The smaller tab 134 extends from the upper edge of the first component holder 116 and frictionally fits into the smaller pocket 130 at a. The larger tab 136 is too large to fit into the smaller pocket 130 and the smaller tab 134 is too small to frictionally engage the sides of the larger pocket 132. During assembly, this arrangement provides tactile feedback to a person assembling the support frame into the shell that the orientation of the support frame in the shell is correct. The support frame including the holders with the electrical components may be readily attached to the shell in the correct orientation by an unskilled assembler or by a person without a clear view of the interior of the shell.

Figure 10D:
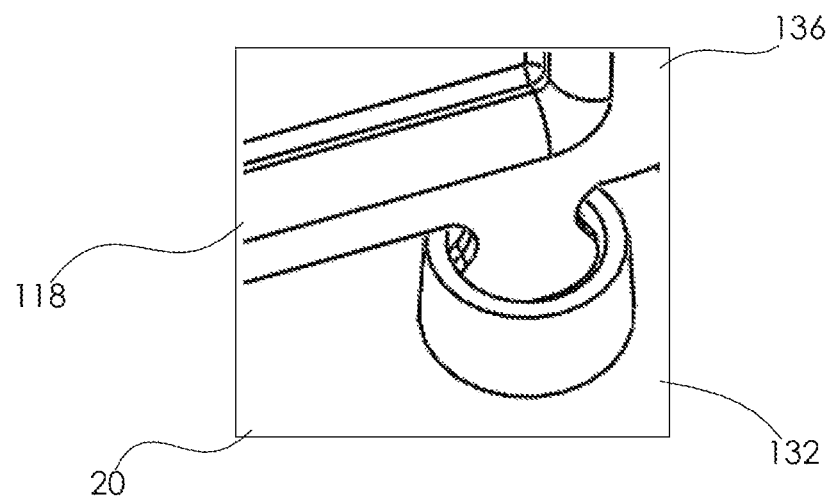
FIG. 10d shows a perspective view of a portion of the example fixture, illustrating the insertion of the larger tab 136 into the larger pocket 132.
Figure 10E:
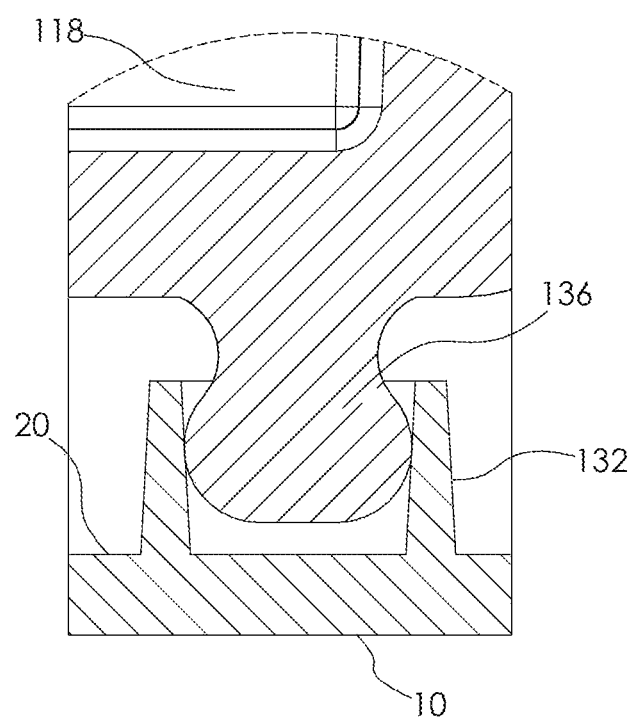
FIG. 10e shows an orthogonal section view of a portion of the example fixture, illustrating the larger tab 136 held with a sliding fit in the larger pocket 132.

FIG. 10d shows a perspective view of a portion of the fixture, viewed from within the chamber looking toward the third inner surface 20, illustrating the interaction of the larger tab 136 and the larger pocket 132. FIG. 10e shows an orthogonal section view of a portion of the fixture of FIG. 10d.

Since, in this example fixture, ΔABC is equilateral, it may be possible to incorrectly insert the support frame upside down. However, since the tabs extend out from a transverse side of the respective holder, when inserted incorrectly, both tabs on one holder cannot simultaneously engage both pockets, providing a tactile prompt that the support frame has been installed incorrectly in the shell. The upper edge of a holder is a transverse side closest to the top of the shell when the holder is installed in the shell. The lower edge of a holder is a transverse side closest to the base when the holder is installed in the shell.

Since, in this example fixture, ΔABC is equilateral, it may be possible to incorrectly rotate the support frame ±120° before being inserted. One way of preventing this is another example that would include at least one holder wider or narrower than the others. If only one holder is wider or narrower, the resulting triangle ΔABC is isosceles, allowing upside-down insertion but preventing rotated insertion. If two holders are wider or narrower than the others, the resulting triangle ΔABC is scalene, preventing both errors.

In any such alternative arrangement, when the axes of rotation through the pins 124 of the holder connection 122 are parallel, the two barrels 126 of the first component holder 116 may possibly be snapped onto the two pins 124 of the third component holder 120. If these axes are not parallel, this connection cannot be made reliably. However, in this example fixture, the axes of rotation through the pins 124 are not parallel, but rather converge at a point, allowing the holder connections 122 of the support frame to more closely conform to the second inner surface 18 as the chamber 14 narrows toward the third inner surface 20. When these axes are arranged as described, if the holders are not approximately equal widths, the two barrels 126 on the longitudinal side of the first component holder 116 will not securely attach to the pins 124 of the third component holder 120. Thus the holders are approximately equal widths. Therefore, in this example fixture, the triangle ΔABC is equilateral and both errors are possible.

Referencing FIG. 10c, when the support frame is rotated by 120° clockwise (incorrectly) and inserted, the smaller tab 134, now at location b is too small to be held by the larger pocket 132. Similarly when the support frame is rotated by 120° counterclockwise (incorrectly) and inserted, the larger tab 136 now at location a is rejected by the smaller pocket 130. Therefore, with either error, the attachment cannot be made.

Alternatives of this Example Fixture

It will be apparent that a number of alternative arrangements of tabs and pockets are possible and accomplish some or all of the functionality presented. For example, if A-a differs sufficiently in length from B-b, both pockets may be shaped identically. One of the tabs may be located on the third inner surface while the corresponding pocket is attached to the corresponding holder. Location a may be outside ΔABC while location b may be inside ΔABC, or vice-versa. Additional sets of tab and pocket may be added for increased holding power and stability. For example, at location c on line segment B-C where lengths of line segments A-a≠B-b≠C-c at location c' away from line segment B-C. The inner aspects of the pockets may have negative draft, requiring more force of attachment and detachment, for improved retention. The pockets may alternatively be replaced with slots, where the tab and slot at b, for example, aligns with line segment A-B, while the tab and slot at a forms an angle with line segment A-C.

Operation of this Example Fixture

To assemble the support frame of this example fixture into the shell, the support frame is oriented so each holder connection engages a corresponding guide disposed on the second inner surface of the shell, and the support frame is slid into the shell until the upper edge of one of the holders is near the third inner surface and the larger tab 136 slideably frictionally attaches to the larger pocket 132 while the smaller tab 134 slideably frictionally attaches to the smaller pocket 130.

Description of Another Example Fixture

Figure 11A:
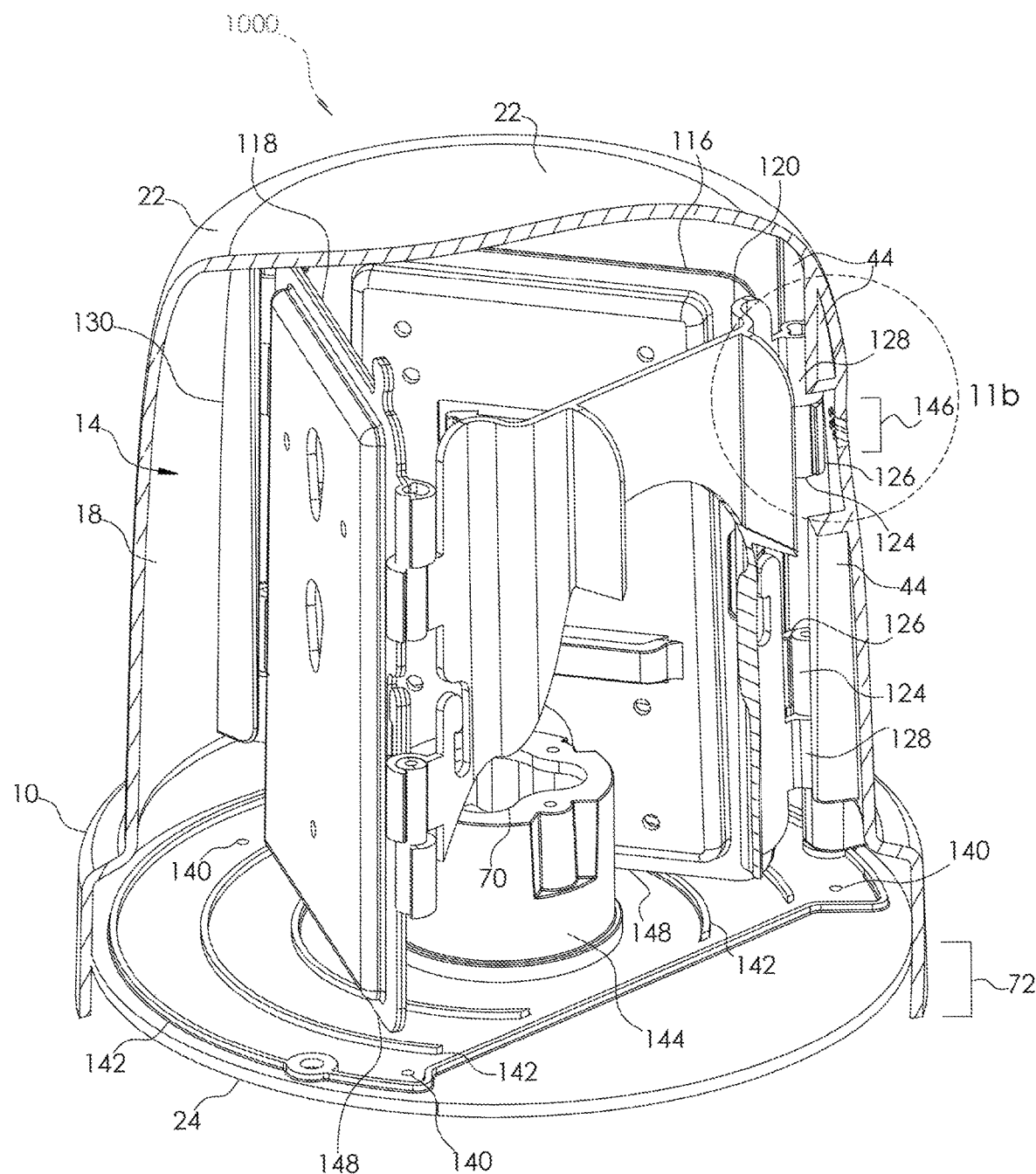
FIG. 11a shows a perspective view of an example fixture, with part of the shell removed to show an example of a support frame, base, and socket for holding a first electrical connector. The first electrical connector may be referred to as a power entry connector.
Figure 11B:
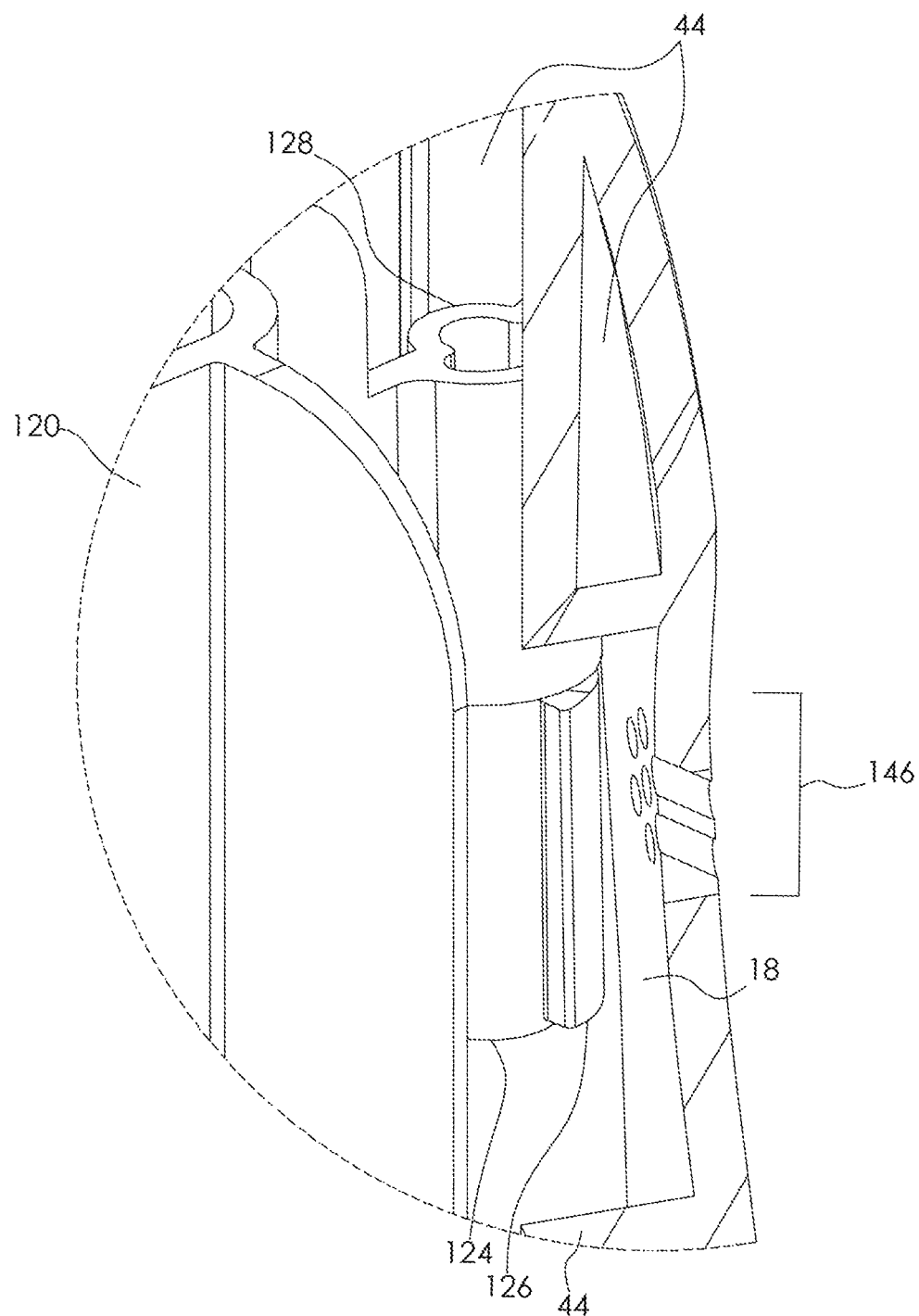

FIG. 11a shows a perspective view of an example fixture viewed from the side, with a portion of the shell 10 and the third component holder 120 cut away. FIG. 11b shows a detail an example of vent openings 146 and surrounding structures of the example fixture of FIG. 11a. Several features protect the electrical components (not shown) and support members such as stand-offs in the chamber 14 from contamination. If condensation forms, it is pulled by gravity and guided to the surface of the base facing the chamber 14. One or more drain openings 140 provide a path for condensation to drain from the chamber 14. A series of fenders 142 on the surface of the base facing the chamber 14 minimize contact between the second transverse side 220 of each of the holders and the base, further separating components installed on the holders (116, 118, 120) from liquid that may have drained onto the base 24. The holders and inner surfaces of the shell are made from non-porous material to oppose wicking.

To prevent condensation from damaging the power entry connector (not shown), the socket wall 144 is solid all around, non-porous and extends from the base 24 farther than the fenders 142 extend. Thus, accumulating condensation will drain through the drain openings 140 before flowing into the socket hole 70.

To encourage evaporation of condensation by air convection, vent openings 146 pierce the shell 10 through the outer surface 22 toward the second inner surface 18. In this example fixture, the inner surface of each a vent opening 146 is a cylinder, there are seven of them, arranged close to each other, six in a circular pattern and one centrally, the pattern small enough to emerge from the second inner surface 18 entirely between a predetermined pair of longitudinal ribs forming one of the guides 44. Convection increases with vertical distance between drain openings 140 and vent openings 146. Convection is also restricted by the total cross sectional areas of drain openings and the vent openings.

The cross section of each drain opening is large enough to drain water, that is, to prevent a height of meniscus due to capillary action greater than the thickness of the base, as further described by Jurin's Law. However, both drain openings and vent openings 146 are small enough to prevent insects such as moths, bees, wasps, flies, beetles, and other insects from entering the interior chamber of the shell. The vent openings 146 slope upward from the outer surface 22 to the second inner surface 18. A greater slope provides greater mitigation against wind driven contamination such as, for example dust, guano, rain or mist and sleet. The skirt 72 also mitigates against wind driven contamination entering the drain openings 140, essentially limiting the amount of wind from flowing between the shell 10 and the powered structure 68.

To further mitigate against wind driven moisture in a base-below-chamber installation, the vent openings are located so as to emerge on the second inner surface between the parallel longitudinal ribs of the guide 44 and immediately adjacent a barrel 126 and a pin anchor 128 with pin 124. The barrel 126 and pin 124 block the moisture and it remains in the channel formed by the adjacent second inner surface 18 and the parallel longitudinal ribs forming one of the guides 44. The moisture drains by gravity toward the end of the channel near the base 24 close to one of the drain openings 140.

Alternatives of this Example Fixture

The fenders 142 may instead be replaced by one or more features on the lower edge 148 of the holders that would otherwise contact the base, such as a nub or nubs. The drain openings need not be three round holes, as shown, but may alternatively have a different number, different cross-section than circular, such as slots, or varying cross-sections. They will not drain, however, if the cross-section is so small as to create a height of meniscus, due to capillary action, that is greater than or equal to the thickness of the base, as further described by Jurin's Law. To prevent a build-up of guano or other debris blocking the vent openings, a shield or cowl may be incorporated. The vent openings do not have to be one pattern, may be several patterns, or may be individually distributed about the shell. For example, there may be another such pattern for each holder connection blocking wind-driven ingress. The pattern of the vent openings may be non-circular, the number of perforations may be more or less than seven, and each vent opening may have a non-circular cross section. Alternatively, an air-permeable solid such as a breather vent may be used.

Operation of this Example Fixture

These features are solid state, and operate passively as assembled. If the installation is such that the base is below the chamber, convection proceeds by heated air leaving through the vent openings 146, replaced by cooler air being drawn in through the drain openings 140. If the installation is such that the base is above the chamber, then convection path is reversed. If the fixture is mounted to the side of the powered structure, convection will work best when the vent openings exiting the outer surface face downward, in part to provide the greatest height difference between vent openings 146 and drain openings 140, and in part so rain will not fall through the vent openings. Note that with this horizontal installation, most condensation will flow downward but not between the parallel longitudinal ribs, and therefore not drain through the vent openings. However, condensation will still flow toward one of the drain openings 140.

The fenders are intended to operate when the base is below the chamber. However, if the fixture is installed with the base above the chamber, the tab-and-blind-pocket attachment described in the previous example fixture will similarly minimize wicking from the third inner surface along the holders to the electrical components.

Description of Another Example Fixture

Figure 12A:
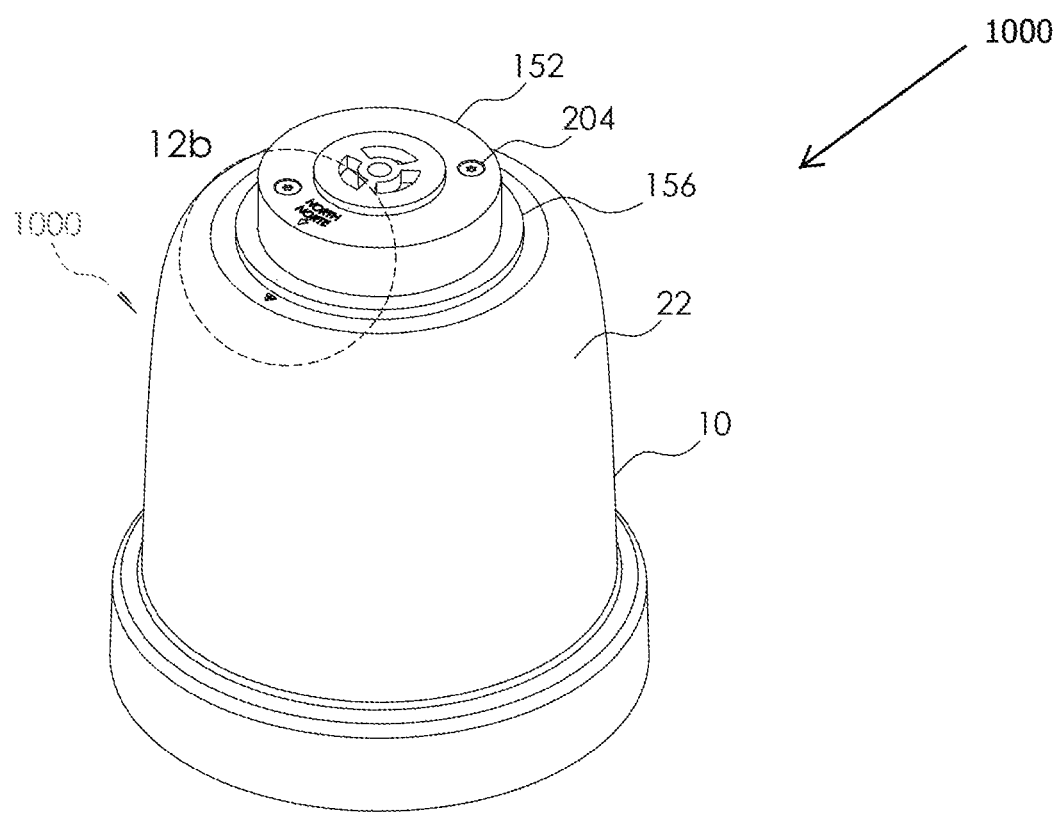
FIG. 12a shows an isometric perspective view of another example fixture having an optional second electrical connector installed on the top end of the shell. The second electrical connector may be referred to as a shell receptacle.
Figure 12B:
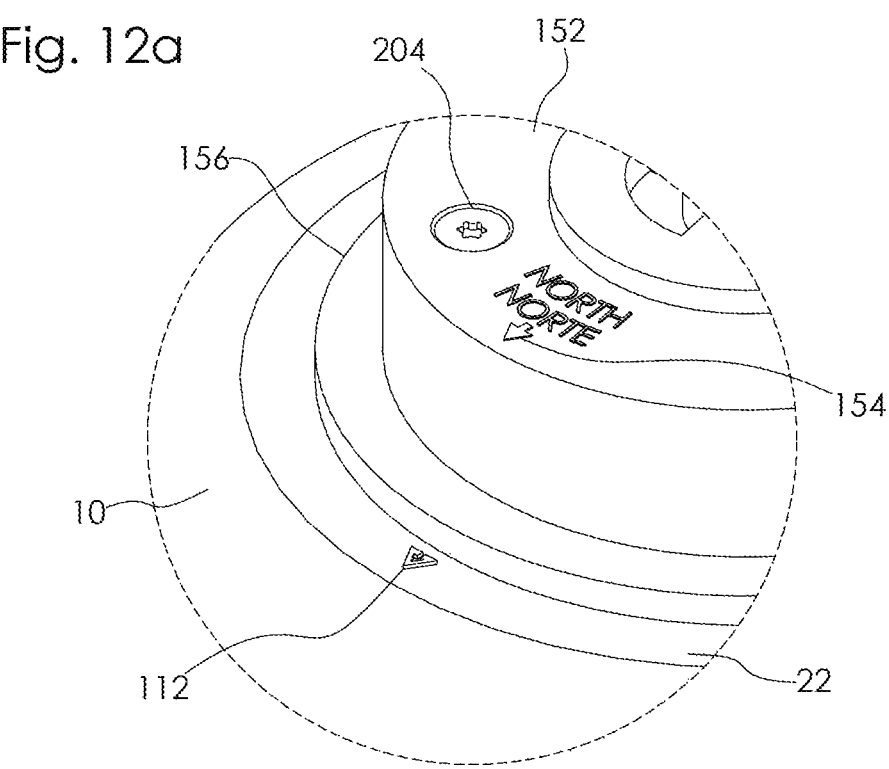
FIG. 12b shows a detail view of a portion of the example fixture of FIG. 12a, including alignment details and examples of symbols for marking a selected cardinal direction for installation of the fixture.
Figure 12C:
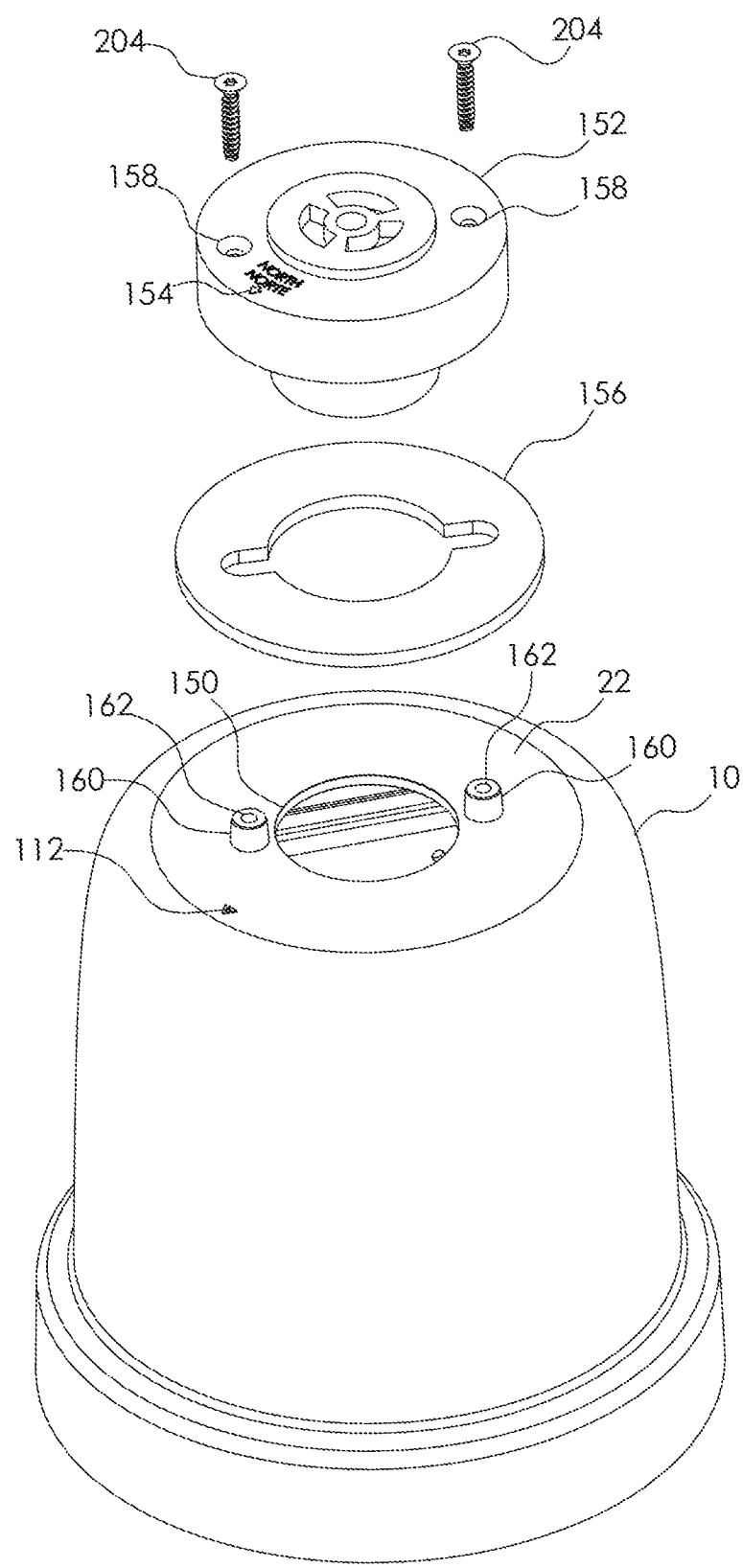

FIG. 12a shows an isometric perspective view of another example fixture. FIG. 12b shows a detail view of a portion of the example fixture of FIG. 12a, clarifying the alignment of an example shell north mark 112 with an example shell receptacle north mark 154. FIG. 12c shows an exploded perspective view of the example fixture of FIG. 12a.

A round shell portal 150 centrally located on and through the third inner surface (not shown) is large enough to closely accommodate a one shell receptacle 152, identical to the host receptacle (66 of FIG. 2). In this example fixture, the shell receptacle, specifically a commercially available ANSI-compliant Intermatic K121 Locking Type NEMA Receptacle available from Intermatic Incorporated, Spring Grove, Ill., is arranged so that a shell receptacle north mark 154 aligns with the shell north mark 112. Note that in this example, the outer surface 22 is flat at the interface of the shell 10 and the shell receptacle 152. A shell gasket 156 seals this interface. The shell receptacle 152 is rigidly reversibly attached to the outer surface 22 of the shell 10 by two shell receptacle fasteners 204 which clear two shell receptacle mounting holes 158 and rigidly attach to two round bosses 160, each located on the shell 10 in line with the shell receptacle mounting holes 158, and each of which has a coaxial through-hole 162 sized for its shell receptacle fastener.

Figure 12D:
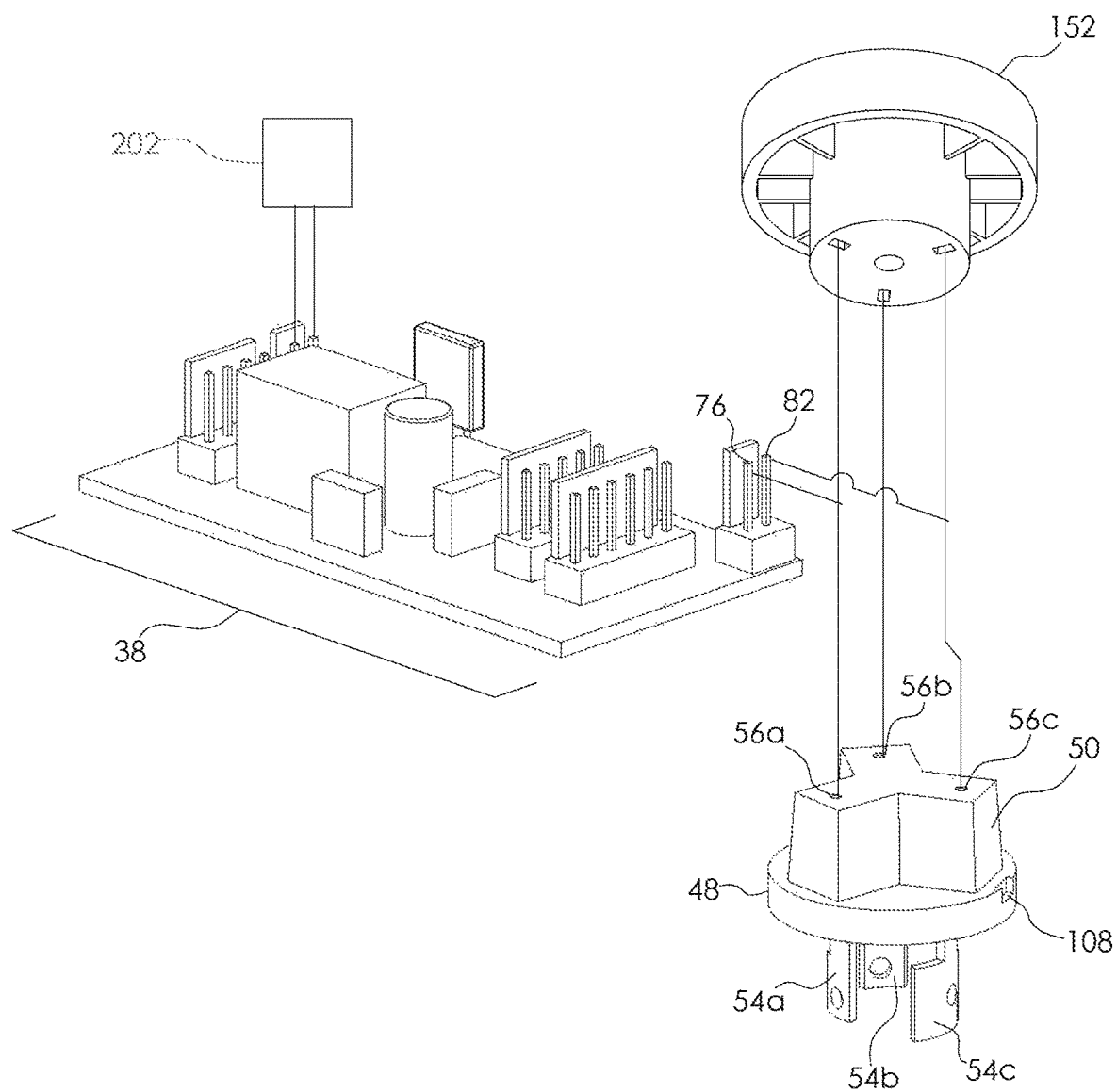

FIG. 12d is a schematic of wiring among the power entry connector 48, the electrical components 38, and the shell receptacle 152 configured to accept a plug (not shown) identical to the power entry connector 44. A line blade 54a on the power entry connector 48 is electrically connected to a line terminal 56a, to a load pin 76, and to the line contact in the shell receptacle 152. A load blade 54b is electrically connected to a load terminal 56b and to a load contact in the shell receptacle. A neutral-or-common blade 54c is electrically connected to a neutral-or-common terminal 56c, to a neutral-or-common pin 82, and to a neutral-or-common contact in the shell receptacle. Thus the fixture may be quickly and easily interposed between the host receptacle 66 and any legacy equipment thereon, with no change to the legacy equipment except the shell receptacle takes the place of the host receptacle, but shifted by the height of the fixture. In particular, any orientation toward the points of the compass is preserved.

Alternatives of this Example Fixture

Rather than use the shell gasket 156, ingress between shell receptacle 152 and shell 10 may be prevented by another arrangement such as, for example, by a continuous circular rib around the perimeter of the shell portal 150. Some applications may require a shell receptacle 152 different from the host receptacle 66, however, such a shell receptacle must be appropriate to the voltage and amperage it supplies.

Operation of this Example Fixture

During installation, an installer removes the legacy equipment from the host receptacle 66, installs the fixture onto the host receptacle 66, and then installs the legacy equipment onto the shell receptacle. Some legacy equipment may require additional steps to accommodate the temporary interruption in power.

Description of Another Example Fixture

Figure 13A:
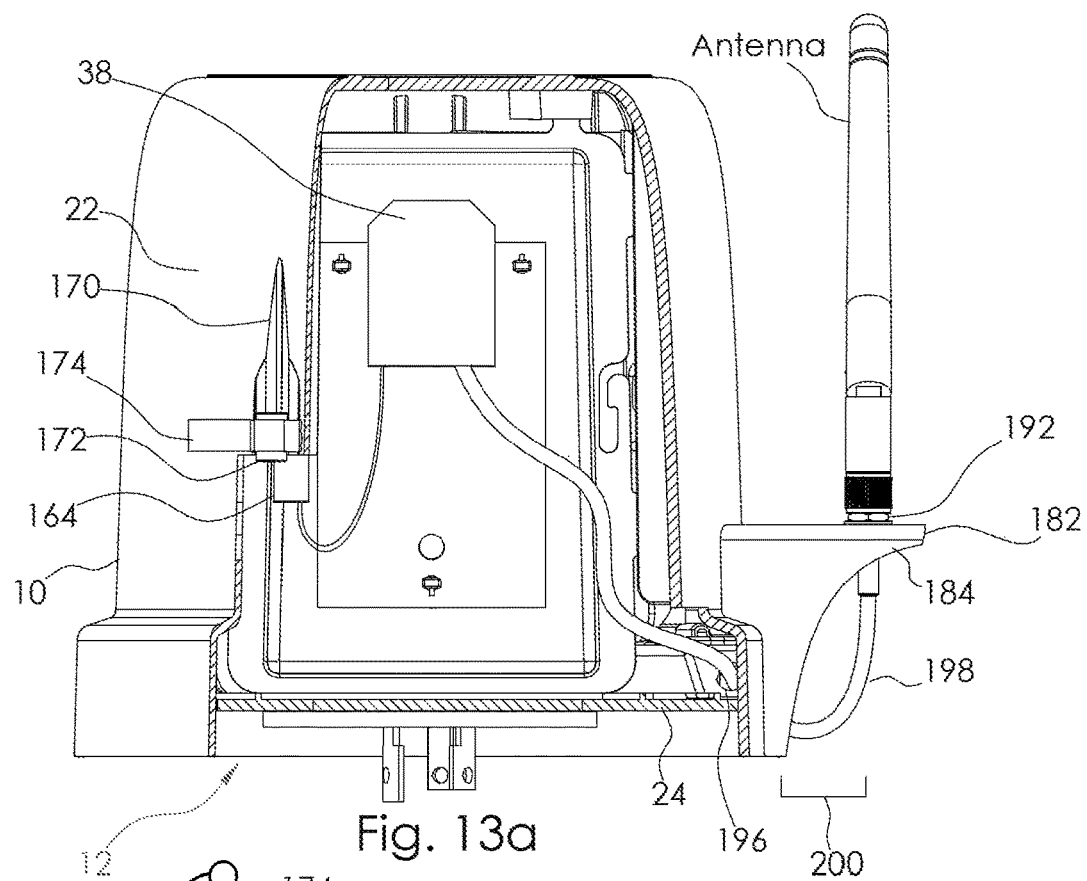
FIG. 13a shows an orthogonal front view of the example fixture, with the shell 10, base 24, and an example of a retainer 174 partially cut away to show examples of electrical components inside the shell and an optional antenna and antenna cable formed with a drip loop.
Figure 13B:
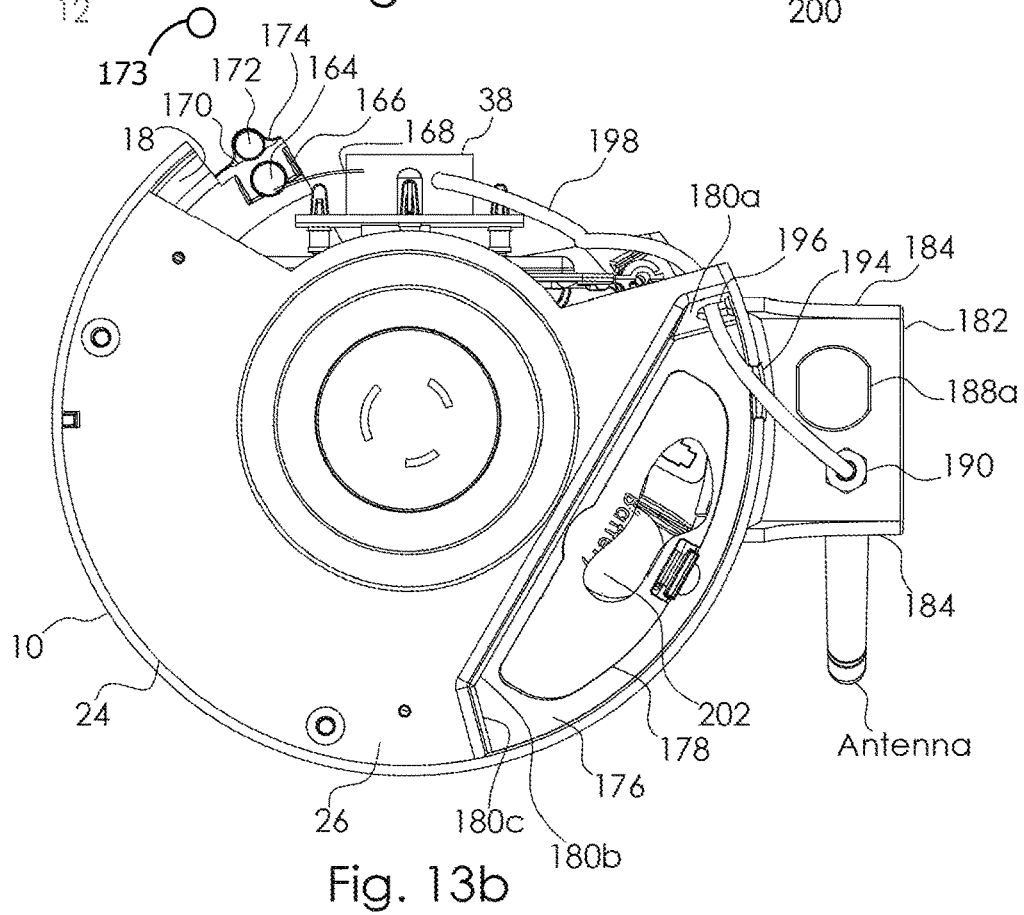
FIG. 13b shows an orthogonal bottom view of the example fixture of FIG. 13a, with the example shell, retainer, base and battery cover partially cut away.
Figure 13C:
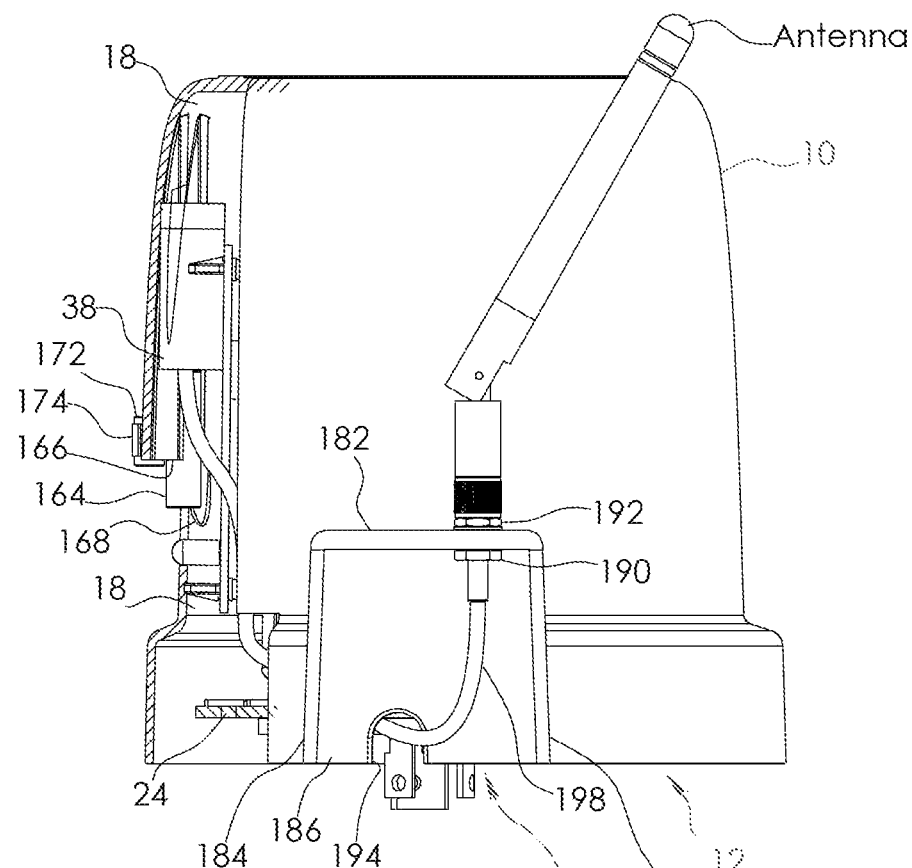
FIG. 13c shows an orthogonal side view of the example fixture of FIGS. 13a and 13b, with the example antenna connector removed and the shell partially cut away.
Figure 13D:
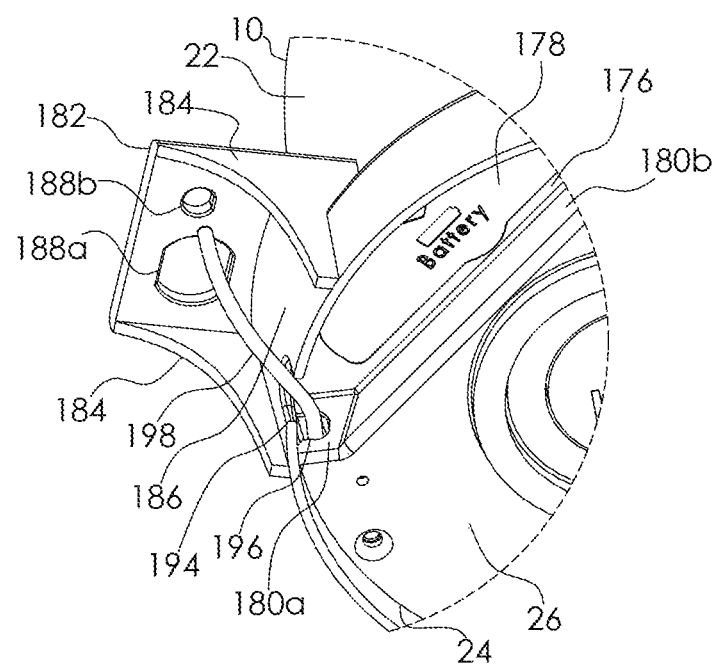
FIG. 13d shows a perspective detail view an example platform and surrounding structure of the example fixture of FIG. 13a, with the antenna removed.

FIG. 13*a* shows an orthogonal front view of another example fixture, with an example shell 12, base 24 and retainer 174 partially cut away. FIG. 13*b* shows an orthogonal bottom view of the fixture of FIG. 13*a*, with the shell, retainer, base and an example battery cover 178 partially cut away. FIG. 13*c* shows an orthogonal side view of the fixture of FIGS. 13*a* and 13*b*. All three show an antenna for reference, attached to a platform. FIG. 13*d* shows a perspective detail view the platform and surrounding structure of the fixture of FIG. 13*a*, with the antenna and antenna connector removed to view the knockouts 188 including the larger knockout 188*a* and the smaller knockout 188*b*.

A shoe 166 is rigidly attached to the second inner surface 18 of the shell 10. The shoe 166 has a slightly tapered inner surface, forming a partial conical inner surface. A magnetically actuated cylindrical electric switch 164 is rigidly frictionally reversibly attached to the shoe 166 by application of pressure, and retained there unless and until pressed out. Two switch wires 168 extend from the switch 164 to the electrical components 38 so the system of electrical components have access to sense and respond to the state of the switch.

A groove 170 in the outer surface is adjacent and parallel to the shoe 166. The groove 170 is deep enough to locate a cylindrical permanent magnet 172 therein. The magnetic field of the magnet 172 is sufficient, while in the groove 170, to keep a normally open switch closed, or a normally closed switch open. A retainer 174 for releasably attaching the magnet 172 to the outer surface 22 at the groove 170, such as, for example, a strip of removable adhesive tape, is shown. The magnetically actuated electrical switch 164 is activated by proximity to the magnet 172. The switch 164 may be deactivated when the magnet 172 is moved away from the switch, for example by separating the shell from the base. The switch 164 may be deactivated when a second magnet 173 is placed externally to the shell and within the activation range of the switch 164.

Thus the fixture provides a convenient way to activate the electrical components 38 at an appropriate time before or after attachment to a host receptacle, quickly, without the need for special skills or tools, and without the need to open the fixture. Moreover, the status of the electrical components 38 is more securely maintained during the service life of the fixture because, to change the state of the switch 164, a magnet and the knowledge of where to place it is required.

The base 24 includes an offset face 176 parallel to the base face 26 and offset from it, and large enough to accommodate a battery cover 178 for accessing, installing or changing a battery 202. Three walls 180, a first wall 180*a*, second wall 180*b*, and a third wall 180*c* span from the base face 26 to the offset face 176. These walls adjoin each other and are solid.

About 4 to 5 cm from the open end 12, a rigid platform 182 extends directly out from the outer surface 22, with two gussets 184 supporting the platform 182, perpendicular to the platform 182 and spanning from the outer surface 22 to the platform 182. The platform 182 and gussets 184 define a minor surface 186 about 4 cm square. The platform includes two knockouts 188 including a larger knockout 188*a* sized and shaped to accommodate a Type N antenna connector (not shown), and a smaller knockout 188*b* sized and shaped to accommodate a one fitting 190 attached to a one SMA or RP-SMA type antenna connector 192. An RP-SMA antenna is shown for reference. A cable 198 connects the antenna connector 192 to the electrical components 38.

The volume bounded by the minor surface 186, the gussets 184 and the platform 182 is large and open enough so tools may be used to tighten the hardware therein, such as tightening the fitting 190 to the platform, and the antenna connector 192 to the fitting.

To accommodate the cable, a first cable notch 194 is placed at the outermost edge of the first wall 180*a*. A second cable notch 196 is placed at the edge of the minor surface 186 near the open end 12. Note that while the second wall 180*b* and third wall 180*c* are perpendicular to the base face 26, the first wall 180*a* is at a 30 to 60 degree angle to the base face 26. The first cable notch 194 and the second cable notch 196 are wide and tall enough to admit the outer diameter of the cable 198. The first cable notch 194 and second cable notch 196 are at locations selected so as to guide the cable 198 in a smooth semicircular arc from the antenna connector 192, passing close to the open end 12 and through the first wall 180*a*. This arrangement forces the cable 198 into a drip loop 200 shape and, when the fixture is installed such that the base 24 is below the chamber 14, the drip loop 200 facilitates rain and condensation movement away from both the antenna connector 192 and the electrical components 38, while keeping the cable 198 from contacting the potentially hot surface of the powered structure (68 in FIG. 2). Thus the service life of the cable 198 is extended.

Forces imparted by the fitting 190 installed in the platform, and any equipment attached to the fitting, should not be so large as to overstress the platform, its connection to the shell, and the power entry connector at the host receptacle (66 in FIG. 2).

Alternatives to this Example Fixture

The switch may be attached to the shoe mechanically, such as by a clip or detent incorporated into the inner dimension of the shoe, or adhesively, or by intermediate hardware. Such alternatives may allow a different shoe internal cross-section, such as cylindrical. The magnet may be releasably attached to the shell mechanically or adhesively. The groove and shoe may be moved to another location on the shell. The groove and shoe may also be used to mount other types of hardware requiring such proximity across the shell.

The platform need not be integral to the shell; instead it may be rigidly mechanically attached. There may be more than one platform. The platform need not necessarily be parallel to the third inner surface. Each platform may have differently shaped gussets, a different number of gussets, or no gussets, provided it is adequately rigid. The platform may be a different shape or size, provided the platform accommodates the fittings. The number of different knockouts may be more or less than two. More than one antenna can be used simultaneously. The antenna need not be directly attached to the antenna connector, but may be mounted remotely. The knockouts may be for fittings for equipment other than antennas, such as for example a camera, a weather sensor or another transducer.

The first cable notch may be sized differently to allow use of a grommet between the first cable notch and the cable. Similarly, the second cable notch may be sized differently to allow use of a grommet between the second cable notch and the cable. If desired, the first cable notch and/or the second cable notch may be sized to press-fit the cable.

Operation of this Example Fixture

During assembly, the antenna cable 198 is routed through the second cable notch before the base is attached to the shell. Subsequently, the antenna cable 198 may be attached to the antenna at the platform either at the assembly line, or later by the installer just prior to installation. The electrical components, or a subset thereof, may be designed to monitor the status of the switch. The changing of the state of the switch may be accomplished by either adding or removing the magnet. When it is added, align the magnet with the groove and use the retainer to retain the magnet in the groove. For example, the magnet may be removed to close a normally open switch, immediately after mounting the fixture to the host receptacle 66. The magnet may be disposed. If the retainer is an adhesive tape, it may be disposed.

Example Battery Holder

Figure 14A:
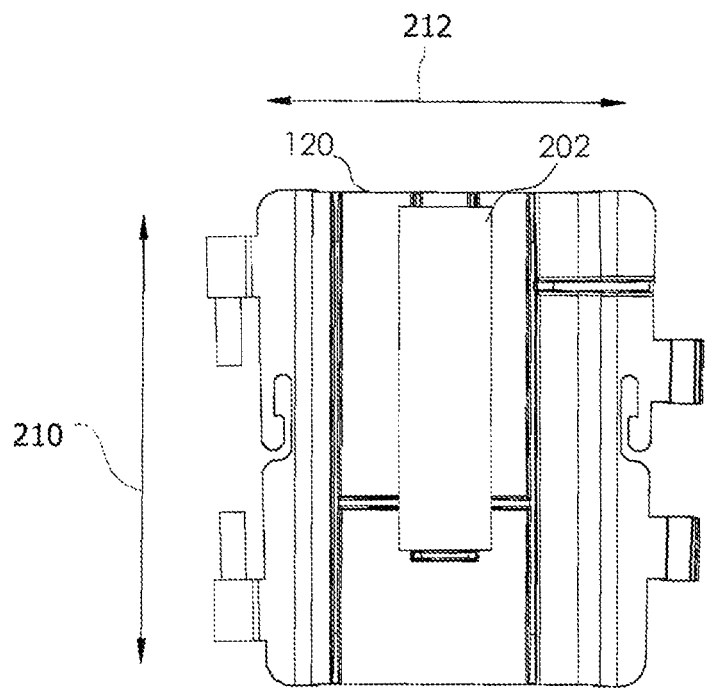
FIGS. 14*a* and 14 *b* show examples of a holder configured for holding different sizes of an electric storage battery.
Figure 14B:
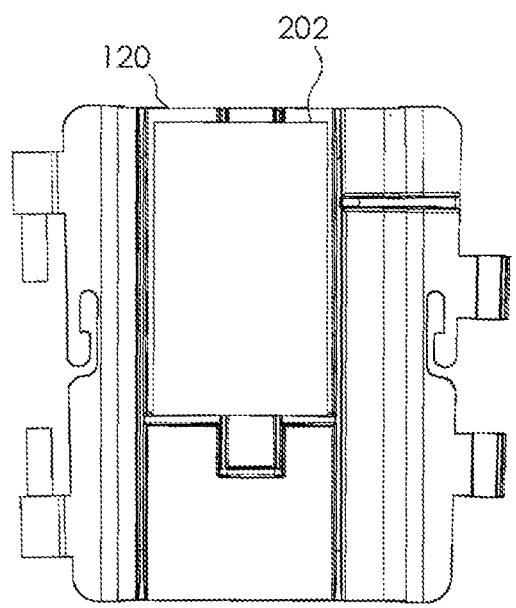

The third component holder 120 shown in FIG. 9c is designed with a collection of ribs (the configuration is displayed of predetermined heights and lengths so that one battery holder will adequately and securely support several commercially available battery form factors. FIG. 14a shows an example third component holder supporting a cylindrical battery (20 mm diameter by 70 mm long). FIG. 14b shows an example third component holder supporting an oblong battery, for example a battery with dimensions 60.49 mm×35.81 mm×5.06 mm, although an embodiment may be configured for batteries of other sizes. An adapter (not shown) approximately 60 mm×35.8 mm×5 mm may be used to fill space between a smaller oblong battery and ribs, while allowing airflow around the smaller oblong battery. For example, an oblong battery (43 mm×20 mm×6 mm) or an oblong battery (5.7×29.5×48.27 mm) may be securely held by such an adapter between the battery holder and the shell.

Unless expressly stated otherwise herein, ordinary terms have their corresponding ordinary meanings within the respective contexts of their presentations, and ordinary terms of art have their corresponding regular meanings.

What is claimed is:

1. An apparatus comprising a support frame, said support frame comprising:
   a first component holder, a second component holder rotatably connected to said first component holder, and a third component holder rotatably connected to said second component holder, each of said first, second, and third component holders including a first longitudinal side and a second longitudinal side transversely opposite said first longitudinal side, a holder connector with a pin attached to said first longitudinal side, and a holder connector with a barrel attached to said second longitudinal side;
   said holder connector with a barrel on said second longitudinal side of said second component holder positioned to retain said holder connector with a pin on said first longitudinal side of said first component holder; and
   said holder connector with a barrel on said second longitudinal side of said third component holder positioned to retain said holder connector with a pin on said first longitudinal side of said second component holder.

2. The apparatus of claim 1, further comprising said holder connector with a barrel on said second longitudinal side of said first component holder positioned to retain said holder connector with a pin on said first longitudinal side of said third component holder.

3. The apparatus of claim 1, further comprising said holder connector with a barrel on said second longitudinal side of said second component holder positioned to retain said holder connector with a pin on said first longitudinal side of said first component holder.

4. The apparatus of claim 1, further comprising said holder connector with a barrel on said second longitudinal side of said third component holder positioned to retain said holder connector with a pin on said first longitudinal side of said second component holder.

5. The apparatus of claim 1, further comprising a shell having a guide on an interior surface of said shell, said support frame slidably engaged with said guide.

6. The apparatus of claim 5, further comprising a base connected to said shell.

7. The apparatus of claim 6, wherein said support frame contacts said base.

8. The apparatus of claim 1, further comprising:
   a second of said holder connector with a barrel on said second longitudinal side of said first component holder; and
   a second of said holder connector with a pin on said first longitudinal side of said third holder connector, said second holder connector with a pin on said third holder connector positioned for engagement with said second holder connector with a barrel on said first component holder.

9. The apparatus of claim 1, wherein said barrel retains said pin with a snap fit.

* * * * *